(12) United States Patent
Uibel et al.

(10) Patent No.: US 10,328,620 B2
(45) Date of Patent: Jun. 25, 2019

(54) COMPONENT PARTS PRODUCED BY THERMOPLASTIC PROCESSING OF POLYMER/BORON NITRIDE COMPOUNDS, POLYMER/BORON NITRIDE COMPOUNDS FOR PRODUCING SUCH COMPONENT PARTS, METHOD FOR PRODUCING SUCH COMPONENT PARTS AND USE THEREOF

(71) Applicant: 3M INNOVATIVE PROPERTIES COMPANY, St. Paul, MN (US)

(72) Inventors: Krishna B. Uibel, Waltenhofen (DE); Robert Schädel, Kempten (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 498 days.

(21) Appl. No.: 15/029,526

(22) PCT Filed: Oct. 13, 2014

(86) PCT No.: PCT/EP2014/071836
§ 371 (c)(1),
(2) Date: Apr. 14, 2016

(87) PCT Pub. No.: WO2015/055552
PCT Pub. Date: Apr. 23, 2015

(65) Prior Publication Data
US 2016/0263791 A1   Sep. 15, 2016

(30) Foreign Application Priority Data
Oct. 14, 2013 (EP) .................................... 13188410

(51) Int. Cl.
*B29C 45/00* (2006.01)
*B29C 45/77* (2006.01)
(Continued)

(52) U.S. Cl.
CPC .......... *B29C 45/0013* (2013.01); *B29C 45/77* (2013.01); *C08K 3/38* (2013.01);
(Continued)

(58) Field of Classification Search
CPC ...... C08K 2003/385; C08K 3/34; C08K 7/14; C08K 3/38; B29C 45/0013; B29C 45/77;
(Continued)

(56) References Cited

U.S. PATENT DOCUMENTS 5,854,155 A   12/1998   Kawasaki
6,048,511 A   4/2000    Shaffer
(Continued)

FOREIGN PATENT DOCUMENTS

DE   102010050900   5/2012
EP   0939066        9/1999
(Continued)

OTHER PUBLICATIONS

Jang Min Park, et al., "Flake Orientation in Injection Molding of Pigmented Thermoplastics", Journal of Manufacturing Science and Engineering, New York, NY, vol. 134, Feb. 2012, 4 pgs. XP009195513.
(Continued)

*Primary Examiner* — Joseph S Del Sole
*Assistant Examiner* — Emmanuel S Luk
(74) *Attorney, Agent, or Firm* — Thomas M. Spielbauer

(57) ABSTRACT

The invention relates to a method for producing a component part having a wall thickness of at most 3 mm on at least one part of the component part, comprising the method step of injection molding by means of an injection mold in an injection molding machine using a polymer/boron nitride compound, wherein the polymer/boron nitride compound comprises a thermoplastically processable polymer material and a heat-conducting filler, wherein the filler comprises platelet-shaped hexagonal boron nitride particles and wherein the injection rate during injection-molding is at most 200 mm/s. The invention further relates to a component part produced using such a method and a polymer/boron nitride compound for producing such a component
(Continued)

Figure 1:
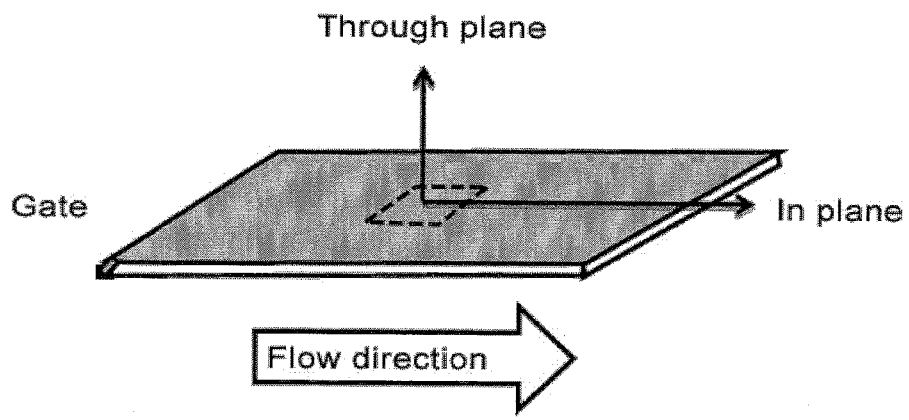

part. The invention further relates to the use of such a component part for heat dissipation of component parts and assemblies to be cooled.

16 Claims, 6 Drawing Sheets

(51) Int. Cl.
  *C08K 3/38* (2006.01)
  *B29K 507/02* (2006.01)
  *B29K 509/08* (2006.01)
  *C08K 3/34* (2006.01)
  *C08K 7/14* (2006.01)
(52) U.S. Cl.
  CPC ............ *B29C 2945/76531* (2013.01); *B29C 2945/76545* (2013.01); *B29C 2945/76765* (2013.01); *B29K 2507/02* (2013.01); *B29K 2509/08* (2013.01); *C08K 3/34* (2013.01); *C08K 7/14* (2013.01); *C08K 2003/385* (2013.01)
(58) Field of Classification Search
  CPC .......... B29C 2945/76531; B29C 2945/76545; B29C 2945/76765; B29K 2507/02; B29K 2509/08
  See application file for complete search history.

(56) References Cited

U.S. PATENT DOCUMENTS

| | | | |
|---|---|---|---|
| 6,096,671 A | 8/2000 | Kawasaki | |
| 2002/0006373 A1 | 1/2002 | Clere | |
| 2004/0131841 A1* | 7/2004 | Koide | B29C 45/0013 428/323 |
| 2004/0208812 A1 | 10/2004 | Clere | |
| 2006/0127422 A1 | 6/2006 | Lodyga | |
| 2012/0114905 A1* | 5/2012 | Engler | C01B 21/0648 428/143 |
| 2013/0202882 A1* | 8/2013 | Uchida | B29C 45/0013 428/338 |

FOREIGN PATENT DOCUMENTS

| | | |
|---|---|---|
| EP | 1 908 802 A1 | 4/2008 |
| JP | 2011-148917 A | 8/2011 |
| JP | 2012-136684 A | 7/2012 |
| WO | WO 2003-013845 | 2/2003 |
| WO | WO 2005-021428 | 3/2005 |
| WO | WO 2013-167306 A1 | 11/2013 |

OTHER PUBLICATIONS

"Bornitrid—Boron nitride fuelstoffe fuer polymer", Henze, HeBoFill, 1 page, XP055115327.

Verlag, "Warme besser leiten", Kunststoffe, Dec. 31, 2009, pp. 55-60, XP055111083.

Jae-Do Nam, "Development of smart heat sink composites using hybrid fillers", Society of plastics Engineers, 2 pages.

Damasch Bornitrid als multifunktioneller Fullstoff in Polymersystem, May 7, 2007, XP055109849, pp. 417-456.

International Search Report for PCT International Application No. PCT/EP2014/071836 dated Feb. 9, 2015, 3 pages.

* cited by examiner

COMPONENT PARTS PRODUCED BY THERMOPLASTIC PROCESSING OF POLYMER/BORON NITRIDE COMPOUNDS, POLYMER/BORON NITRIDE COMPOUNDS FOR PRODUCING SUCH COMPONENT PARTS, METHOD FOR PRODUCING SUCH COMPONENT PARTS AND USE THEREOF

CROSS REFERENCE TO RELATED APPLICATIONS

This application is a national stage filing under 35 U.S.C. 371 of PCT/EP2014/071836, filed Oct. 13, 2014, which claims the benefit of European Application No. 13188410.8, filed Oct. 14, 2013, the disclosure of which is incorporated by reference in their entirety herein.

The present invention relates to a component part produced by thermoplastic processing of a polymer compound using platelet-shaped hexagonal boron nitride particles with high through-plane thermal conductivity, a polymer/boron nitride compound for producing such component parts, a method for producing such component parts and the use of such component parts for heat dissipation.

Thermoplastically processable plastics are used in a variety of applications. For that purpose the properties of the base polymer are often modified by compounding with additional components and are thereby customized for each application.

Organic, mineral, ceramic, vitreous and metallic fillers, for example, may be used as additional components for compounding with the polymer matrix. The fillers may be present as blocky, spherical, platelet-shaped or fibrous particles, for instance, or as particles having an irregular morphology. The additional components may be used, for example, to modify the mechanical or electrical properties, the coefficient of thermal expansion or the density, or to increase thermal conductivity.

During compounding, a mixed material consisting of polymers and the additional components forms, which typically accumulates in the form of granules, and which is further processed in shaping processes. Shaping to form component parts is preferably carried out by injection molding.

To produce heat-conductive polymer-based mixed materials, heat-conductive fillers are introduced into the oftentimes only poorly heat-conductive thermoplastic matrix. Hexagonal boron nitride is a highly heat-conductive filler having a platelet-shaped particle morphology, which may be used for producing heat-conductive polymer/boron nitride mixed materials (polymer/boron nitride compounds).

When compounding thermoplastically processable polymers with fillers, extruders are generally used. Twin-screw extruders are used, for example, in which the screws assume further functions in addition to transporting material. Depending on each application, different embodiments may use conveying elements, mixing elements, shearing elements such as, for example, kneading blocks, and backflow elements in different zones in the extruder. Mixing elements and shearing elements ensure good mixing and homogenization of polymer melt and filler.

Fillers may be supplied together with the polymers via the main hopper but also via side feeders. Adding the filler via side feeders is particularly important if the filler is sensitive to shearing. The polymer granules are dosed via the main feeder into the feed zone of the extruder and subsequently melted under high pressure and strong shearing. The shear-sensitive filler is added via a side feeder to the already melted polymer. Glass fibers, for example, which may be used as fillers for mechanical reinforcement, are added in a side feeding under the lowest possible shear at a later point in time of the compounding process.

Fillers which are less sensitive to shearing may be added via additional side feeders already at an earlier point in time during additional side feedings or during the main feeding together with the polymer. Fillers that are less sensitive to shearing or fillers that must be thoroughly homogenized such as, for example, pigments, remain in the extruder longer and, from the point of where they were added, pass through all of the downstream homogenization and shearing areas in the extruder.

Depending on the selected compounding parameters such as, for example, screw speed and temperature, shear-sensitive fillers may undergo degradation or partial degradation. In the case of glass fibers, degradation means a comminution of the glass fibers and, associated therewith, a decline of the mechanical properties of the injection-molded parts consisting of the glass fiber compound.

At the end of the extruder, the compound leaves the extruder through nozzles as a polymer melt in the form of strands. After the strand cools and solidifies, a granulator produces compound granules which are intended for further processing in molding processes.

One possible shaping process for unfilled polymer granules and also for compound granules consisting of polymers and fillers, is injection molding. The polymer granules or the compound granules are remelted in the injection molding machine and filled into a mold under high pressure. There, the polymer melt or compound melt solidifies, and the injection-molded component part can be ejected.

In injection molding, there is great freedom of design with respect to shaping, and complex component parts which may assume numerous functions can be injection-molded. By using fillers, the polymers are adapted to each application and function that they are to fulfill.

Using glass fibers in compounds makes it possible to produce mechanically highly stressable plastic component parts. The tensile strength of the finished injection-molded part is highest in the direction in which the mold was filled when the polymer melt was molded. The glass fibers become strongly oriented during the injection molding process. Because of this orientation, the material properties, for example the mechanical properties, are anisotropic in the injection-molded component part.

It has been shown that in the production of heat-conductive polymer/boron nitride compounds and their processing into component parts, many influencing factors have a significant effect on the thermal conductivity result. These influencing factors include compounding, shaping, sample geometry, sample drawing and the measuring method that is used.

During compounding, for example, co-kneading machines (Buss kneaders), single-screw extruders and twin-screw extruders may be used. Adjustments for rough or gentle compounding can be made via the machine design and/or process parameters. To adjust for relatively rough compounding, it is possible to use both dispersing and shearing elements such as, for example, kneading blocks; to adjust for more gentle compounding, kneading blocks, for example, may be dispensed with altogether. A higher screw speed leads to comparatively stronger shearing of the compound and the filler in the compound, while a lower screw speed leads to comparatively weaker shearing of the compound and the filler in the compound.

When compounding polymers with boron nitride powders, for example with spray-dried boron nitride powder, to form polymer/boron nitride compounds, it has been shown that when 30% by volume boron nitride is added to polyimide (PA 6), rough compounding with strong mixing and shearing and good dispersion of the filler leads to comparatively good mechanical properties of the compound, while thermal conductivity is comparatively lower. Conversely, gentle compounding with low shearing and poorer dispersion leads to compounds with comparatively better thermal conductivity and poorer mechanical properties.

Subsequent shaping also influences the thermal conductivity result. If samples of the polymer/boron nitride compound produced with rough compounding are produced by hot pressing, through-plane thermal conductivity is 40% higher than for tensile test bars produced from the same polymer/boron nitride compound by injection molding. The through-plane thermal conductivity values of the hot-pressed samples are up to 100% higher than those measured on 2 mm thin injection-molded plates. If thin plates having a thickness of 2 mm are produced by injection-molding with the polymer/boron nitride compound produced by gentle compounding, through-plane thermal conductivity is up to 15% higher than that of the injection-molded 2 mm plates from the compound produced by rough compounding.

Sample geometry furthermore also influences the thermal conductivity result. The through-plane thermal conductivity measured on the injection-molded tensile bar having a thickness of 4 mm is up to 50% higher than the through-plane thermal conductivity measured on the injection-molded 2 mm thick plates.

In injection molding, the type of sample drawing also influences the thermal conductivity result. It has been shown, for example, that in rough compounding and injection molding of 2 mm thin plates, the thermal conductivity may differ strongly close to the gate, in the middle of the sample and away from the gate. For instance, the thermal conductivity in high-fill compounds may deviate by as much as 20% depending on the position of the sample draw. In rough compounding and injection molding of tensile test bars, the thermal conductivity of a sample taken close to the gate directly after the first sample shoulder may deviate by as much as 10% from a sample taken away from the gate before the second sample shoulder.

Finally, the measuring method also influences the through-plane thermal conductivity result. If through-plane thermal conductivity is measured using the hot disk method on 4 mm thick injection-molded plates, the measurement result in isotropic fillers is higher by approximately 15-20% than in measurements using the laser-flash method on 2 mm thin injection-molded plates, while up to 50% higher thermal conductivity is measured in platelet-shaped fillers using the hot disk method.

For these reasons, results from thermal conductivity measurements can only be directly compared if the production of the compound, shaping of the compound granules, sample drawing and thermal conductivity measurements are carried out under identical conditions.

Hexagonal boron nitride powder particles that are present as primary particles and not as agglomerates of primary particles have anisotropic thermal conductivity. Well-crystallized boron nitride powder has a platelet-shaped particle morphology. The boron nitride platelets typically have an aspect ratio, i.e. a ratio of platelet diameter to platelet thickness, of >10. The thermal conductivity through the platelet is low compared with the thermal conductivity in the plane of the platelet.

If compounds are produced from a thermoplastic polymer and boron nitride powder in the form of platelet-shaped primary boron nitride particles, the primary boron nitride particles exist mainly in finely dispersed form. If such a compound is injection-molded, the majority of the platelet-shaped primary boron nitride particles, in particular in thin-walled component parts, align themselves plane-parallel to the surface of the injection mold and plane-parallel to the surface of the component part. The alignment of the platelet-shaped primary boron nitride particles occurs due to a shear rate in the injection-molded component part between the regions close to the mold wall and those farther away from it. The alignment of the platelet-shaped primary boron nitride particles in the injection-molded component part leads to an anisotropy of properties, in particular thermal conductivity. The thermal conductivity in thin-walled component parts having a wall thickness of ≤3 or ≤2 mm in the flow direction of the polymer compound (in-plane) is generally over four times greater, and the thermal conductivity through the component-part wall (through-plane) is up to seven times greater and more at filler loadings of ≥30% by volume. Anisotropy in the thermal conductivity of thermoplastic injection-molded component parts is a disadvantage in many applications. Heat dissipation through a housing wall, for example, is likewise low at low through-plane thermal conductivity. In applications using injection-molded housings, this property is disadvantageous since rapid distribution of heat in the housing wall is possible, but heat dissipation through the housing wall is not. Through-plane thermal conductivity that is as high as possible is desirable for these applications, in particular if heat should be dissipated across a two-dimensional area.

With filler loadings of below 50% by volume boron nitride powder in the compound, a value of 1 W/m*K for the through-plane thermal conductivity in injection-molded, thin-walled component parts having wall thicknesses of 2 mm and below is generally not exceeded.

Boron nitride may also be used in the form of agglomerates of platelet-shaped primary particles as a heat-conducting filler in polymers. Different methods for producing boron nitride agglomerates, for example by means of spray-drying, isostatic pressing, or pressing and subsequent sintering are described in US 2006/0 127 422 A1, WO 03/013 845 A1, U.S. Pat. No. 6,048,511, EP 0 939 066 A1, US 2002/0 006 373 A1, US 2004/0 208 812 A1, WO 2005/021 428 A1, U.S. Pat. Nos. 5,854,155 and 6,096,671.

DE 10 2010 050 900 A1 describes a method for producing textured boron nitride agglomerates, in which the boron nitride platelets have a preferred orientation in the agglomerate.

Thermoplastic polymer compounds are produced, for example, by injection molding in an injection molding machine. In the process, compound granules are filled into the injection molding machine, melted and filled into the injection mold under high pressure. Typical injection molding parameters, for example in a low-viscosity polyamide 6 (e.g. Schulamid 6 NV12, A. Schulman, Kerpen, Germany) without fillers, are a melt temperature of the compound melt of 250-270° C., a mold temperature of the injection mold of 60-90° C. and an injection rate of 250 mm/s.

Thermoplastic polymers have very low thermal conductivity of typically <0.3 W/m*K. Thermoplastic compounds with the addition of glass fibers or other, poorly heat-conductive fillers for the most part likewise have low or barely higher thermal conductivity. Because the solidification of a polymer melt having low thermal conductivity begins only slowly during the filling of the mold and continues after filling is completed, low mold temperatures are used in injection molding in order to shorten cycle times and to ensure an economical production. The low mold temperatures are typically used in combination with high injection rates in order to avoid defects in the component and to achieve long flow paths. Due to the low mold temperature during injection molding, regions near the mold wall form where fibers orient more strongly in the direction of the flow in low heat-conductive glass fiber-containing compounds during the filling of the mold, resulting in higher tensile strengths.

In order to optimize injection-molding parameters of compounds having very low thermal conductivity, it is typically preferred that parameters are selected which do not prolong cycle times. For instance, if there are problems during the filling of the mold or with the quality of the injection-molded part, it is preferred that the injection rate, the injection pressure and the melt temperature of the compound melt are increased, and the mold temperature of the injection mold is kept low. In this way, it is possible to produce high-quality injection-molded parts with short cycle times.

If medium and high heat-conductive polymer/boron nitride compounds containing boron nitride agglomerates are processed using these standard injection molding parameters (high injection rate, high melt temperature, low mold temperature), component parts result having comparatively low thermal conductivities, in particular low through-plane thermal conductivities. In glass fiber-containing medium and high heat-conductive polymer/boron nitride compounds, comparatively low strengths are achieved using standard injection-molding parameters. In this case, a through-plane thermal conductivity of 1 to <2.5 W/m*K is considered to be medium heat-conductive, and a through-plane thermal conductivity of ≥2.5 W/m*K is considered to be high heat-conductive.

In polymer/boron nitride compounds with boron nitride agglomerates, high injection molding rates of more than 200 mm/s lead to strong shearing of the boron nitride agglomerates and thus to a degradation of the boron nitride agglomerates into agglomerate fragments or even into primary boron nitride particles in the compound matrix. This lowers the thermal conductivity of injection-molded component parts in all directions in space. In high-fill medium and high heat-conductive compounds, glass fibers are also strongly sheared and damaged at high injection rates. Of particular disadvantage are also the low temperatures of the injection molds that are used, which likewise lead to a degradation of the shear-sensitive fillers. Often, injection-molding machines are not capable of achieving mold temperatures in excess of 150° C. Moreover, the actually achieved mold temperatures may be significantly lower than the set target temperatures. In order to test the mold temperature, it is therefore necessary to take a measurement on the surface of the mold that is in contact with the polymer or the polymer compound when the mold is being filled.

In injection molding of medium heat-and in particular high heat-conducting compounds, the use of standard injection molding parameters leads to clearly developed flow lines on the component part surfaces. This is particularly due to a fountain flow, which conveys the polymer melt again and again from the core region of the molded part to the surface. In injection molding of medium heat-conducting and in particular high heat-conducting compounds using typical mold temperatures, the polymer compound solidifies abruptly, and therefore the frequency of flow line formation is high. In some cases it could be observed that folds of already solidified surface fragments protrude into the component part.

If two already solidified surface fragments meet, it is possible that they will no longer bond, even under high injection pressure and high holding pressure. This leads to poor mechanical properties and poor surface quality of the injection-molded part.

The object addressed by the invention is therefore to provide thermoplastically processable polymer/boron nitride compounds with which, at high levels of process reliability, high through-plane thermal conductivity values and high in-plane thermal conductivity values may be obtained in thin-walled component parts while overcoming the disadvantages of the prior art.

The subject matter of the invention is thus a method for producing a component part having a wall thickness of at most 3 mm on at least one part of the component part, comprising the method step of injection molding by means of an injection mold in an injection molding machine using a polymer/boron nitride compound, wherein the polymer/boron nitride compound comprises a thermoplastically processable polymer material and a heat-conducting filler, the filler comprising platelet-shaped hexagonal boron nitride particles, and the injection rate during injection-molding being at most 200 mm/s.

A further subject matter of the invention is a component part having a wall thickness of at most 3 mm on at least one part of the component part, obtainable through such a method.

A further subject matter of the invention is a component part having a wall thickness of at most 3 mm on at least one part of the component part, wherein the component part is produced by thermoplastically processing a polymer/boron nitride compound and wherein the component part comprises a thermoplastically processable polymer material and a heat-conducting filler, the filler comprising platelet-shaped hexagonal boron nitride particles.

A further subject matter of the invention is a polymer/boron nitride compound for producing such a component part, wherein the polymer/boron nitride compound comprises a thermoplastically processable polymer material and a heat-conducting filler, the filler comprising platelet-shaped hexagonal boron nitride particles.

A further subject matter of the invention is the use of such a component part for heat dissipation of component parts or assemblies to be cooled, preferably electronic component parts or assemblies.

The polymer/boron nitride compounds according to the invention are capable of overcoming the disadvantages of low through-plane thermal conductivity of injection-molded, thin-walled component parts made from polymer/boron nitride compounds.

Through-plane thermal conductivity is the thermal conductivity measured in the through-plane direction, that is, perpendicular to the plate plane. In-plane thermal conductivity is the thermal conductivity measured in the in-plane direction, that is, along the plate plane.

Surprisingly, it has been shown that the through-plane thermal conductivity of the injection-molded, thin-walled component parts can be significantly increased with the polymer/boron nitride compounds according to the invention, while good in-plane thermal conductivity is maintained at the same time.

It is furthermore surprising that polymer/boron nitride compounds with filler loadings of heat-conducting fillers that are not too high may be used for producing the component parts according to the invention. To further adjust the properties of the filled polymer materials, it is therefore possible to add further additives and fillers, for example glass fibers, to increase mechanical stability, so that in most standard thermoplastic polymers, total filler loadings of ≤50% by volume are possible and in TPE polymers (thermoplastic elastomers) ≤70% by volume.

Using the methods according to the invention, considerably higher through-plane thermal conductivities can be achieved in injection-molded, thin-walled component parts of the polymer/boron nitride compounds than in component parts produced using standard injection molding parameters, wherein the development of flow lines is considerably reduced and a nearly flawless surface forms.

It is furthermore surprising that injection molding parameters were found which lead to improved mechanical properties when heat-conducting compounds containing glass fibers are used. The method according to the invention makes it possible to reduce glass fiber shear and orient the glass fibers advantageously in the flow direction. Using the production method according to the invention, the tensile strength of injection-molded samples was increased by up to 15% and more, compared with samples that are produced using standard injection molding parameters.

In thermoplastic injection molding, layers form within the injection-molded part when the mold is filled. Typically, there is an edge layer which already solidifies while the mold is being filled, and therefore the melt does not fill the mold across the entire flow front. Rather, the melt flows between the solidified edge zones to the flow front. Moreover, a shear rate exists between the regions close to the wall and those away from it, wherein the shear rate is highest in the not yet solidified region close to the wall. Here, the melt flows into the mold slower than in the core region. Because of the shear rate in regions close to the wall, anisotropic fillers such as, for example, fibers or platelets, become oriented parallel to the wall surface while the mold is being filled. Within the shear rate close to the wall, the glass fibers orient themselves parallel to the flow direction. Platelet-shaped boron nitride particles orient themselves plane-parallel to the surface of the wall. Adjacent to the regions close to the wall, a core region exists that lies in the center between the regions close to the wall. In the core region, fibers and platelets orient themselves transverse to the main flow direction.

The characteristic development of each layer and the degree of orientation in each layer influences the anisotropy of the component part characteristics with respect to thermal conductivity and strength. For instance, a strongly pronounced core region in polymer/boron nitride compounds containing identical, platelet-shaped boron nitride particles leads to high through-plane thermal conductivity and relatively low in-plane thermal conductivity. At the same time, the strength of polymer/boron nitride compounds containing glass fibers is comparatively lower than in less strongly pronounced core regions. Conversely, strongly pronounced edge regions where the longitudinal orientation of the fibers is parallel to the main flow direction or, in platelet-shaped, heat-conducting particles, plane-parallel to the wall surface lead to comparatively high tensile strength in the main flow direction and comparatively high in-plane thermal conductivity. Both effects, high in-plane thermal conductivity and high tensile strength, may occur at the same time in compounds having platelet-shaped heat-conducting particles in combination with glass fibers.

For the component parts according to the invention consisting of polymer/boron nitride compounds having platelet-shaped boron nitride particles, it has been shown that, surprisingly, the thickness of the middle layer does not increase but rather decreases with rising injection rates. Conversely, low injection rates lead to the development of thick middle layers. Using low injection rates, thick middle layers can thus be produced in the component parts according to the invention, which results in comparatively increased through-plane thermal conductivity.

Surprisingly, in the component parts according to the invention consisting of polymer/boron nitride compounds it has been found that the thickness of the middle layers does not increase when the mold temperature of the injection mold increases, which a person skilled in the art would have expected, but rather, that the thickness of the middle layer decreases. Contrary to expectations, the thickness of the middle layer increases when the mold temperature decreases. At comparatively low mold temperatures, a significant increase in through-plane thermal conductivity was thus detected.

Surprisingly, it has also been shown that in glass fiber-containing polymer/boron nitride compounds and using medium injection rates of about 120 mm/s and high mold temperatures, high strengths can be achieved. This is surprising since it should have been expected that at high mold temperatures, the middle layer is more strongly pronounced and tensile strength thus falls.

FIG. 1 shows a thin, injection-molded plate having the dimensions 80×80×2 mm$^3$ with the gate and in-plane and through-plane directions, in which the thermal conductivity values (in-plane thermal conductivity and through-plane thermal conductivity) are calculated.

Figure 2A:
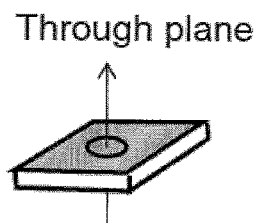
Figure 2B:
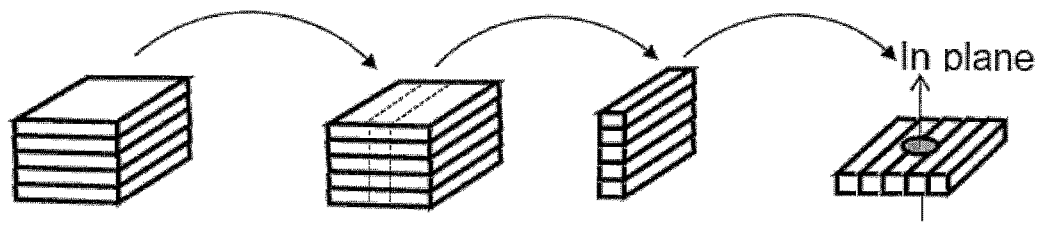

FIGS. 2a and b show the samples that are used for measuring through-plane and in-plane thermal conductivity. FIG. 2a shows a sample having the dimensions 10×10×2 mm$^3$ which was prepared from the center of the injection-molded plate of FIG. 1 and which was used for measuring through-plane thermal conductivity. FIG. 2b shows the preparation of a sample for measuring in-plane thermal conductivity. First, a plate stack of samples having the dimensions 10×10×2 mm$^3$ was produced by gluing using instant glue, wherein said samples consisting of injection-molded plates having the dimensions 80×80×2 mm$^3$ were prepared. From the plate stack, a sample is prepared parallel to the through-plane direction and perpendicular to the flow direction of the injection-molded plates. On this sample, in-plane thermal conductivity is determined.

Figure 3A:
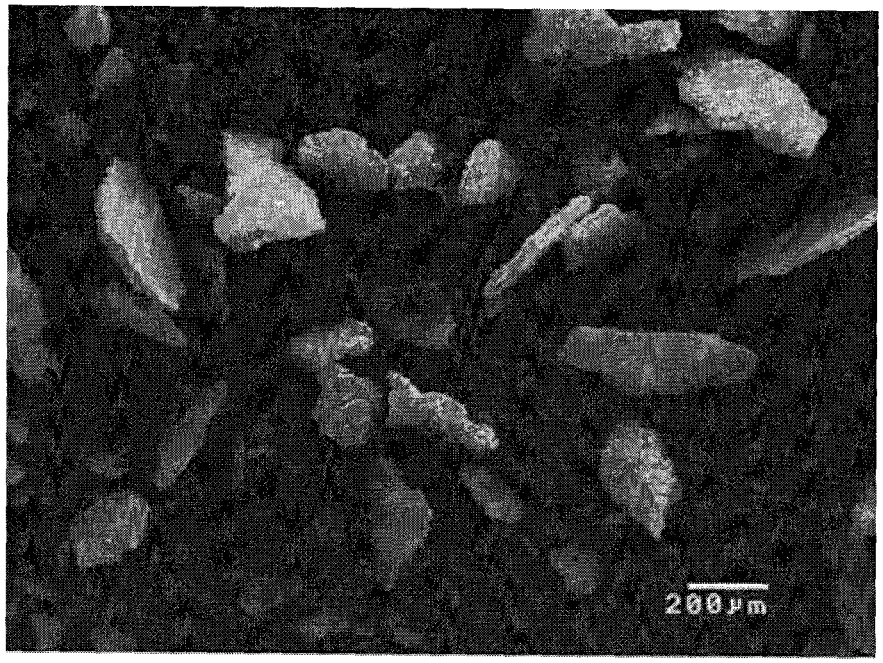
Figure 3B:
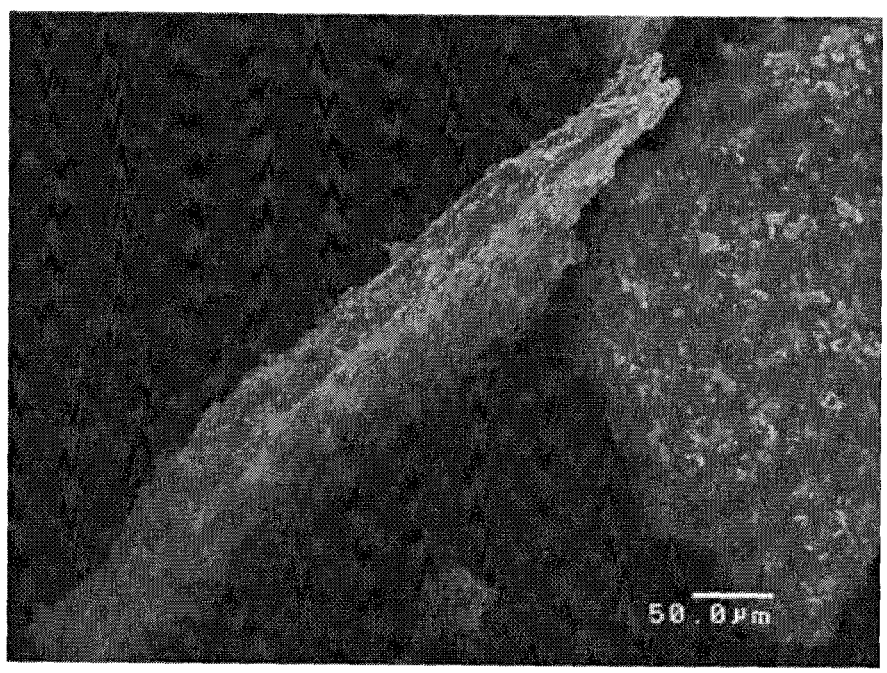

FIGS. 3a and b show SEM images of the boron nitride agglomerates that are used for the component parts and polymer/boron nitride compounds according to the invention from the examples and reference examples. FIG. 3a shows an overview image of the boron nitride agglomerates in the sieve fraction <500 μm. FIG. 3b shows a fractured surface of an agglomerate having a thickness of 30 μm.

Figure 4:
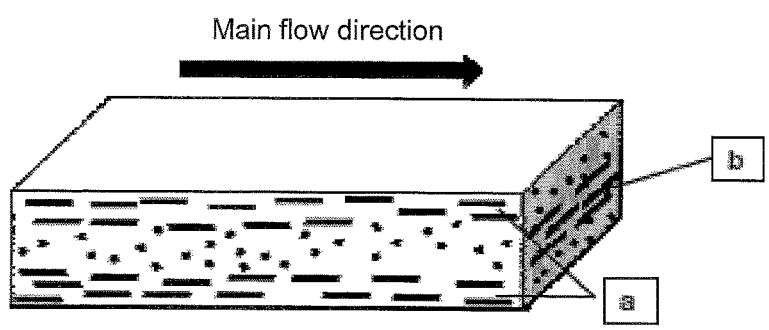

FIG. 4 shows the three-layer model of an injection-molded thin plate consisting of a polymer/boron nitride compound containing fibrous fillers such as, for example, glass fibers. In the two layers close to the wall (a), the fibers are aligned parallel to the main flow direction. If said layers close to the wall are strongly pronounced, it is possible to achieve high tensile strengths in the flow direction. In the middle layer (b), the fibers are oriented transverse to the main flow direction. The middle layer contributes little to the strength of the sample in the flow direction.

Figure 5:
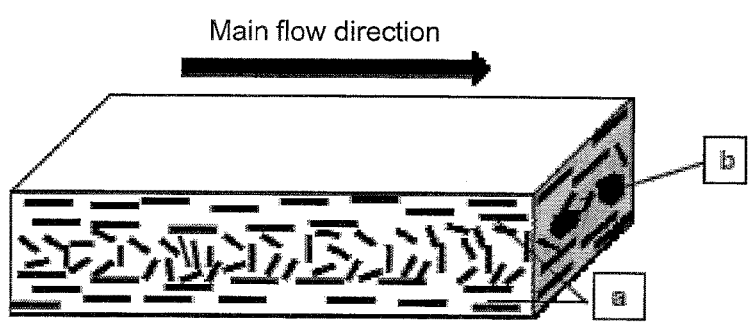

FIG. 5 shows the three-layer-model of an injection-molded thin plate consisting of a compound containing platelet-shaped, high heat-conductive fillers such as, for example, textured scale-like boron nitride agglomerates. In the two layers close to the wall (a), the platelets are aligned parallel to the main flow direction and plane-parallel to the component part surface. If said layers are strongly pronounced, it is possible to achieve high in-plane thermal conductivity. In the middle layer (b), the platelet-shaped filler particles are oriented perpendicular to the main flow direction. If the middle layer is strongly pronounced, high through-plane thermal conductivities can be achieved.

Figure 6A:
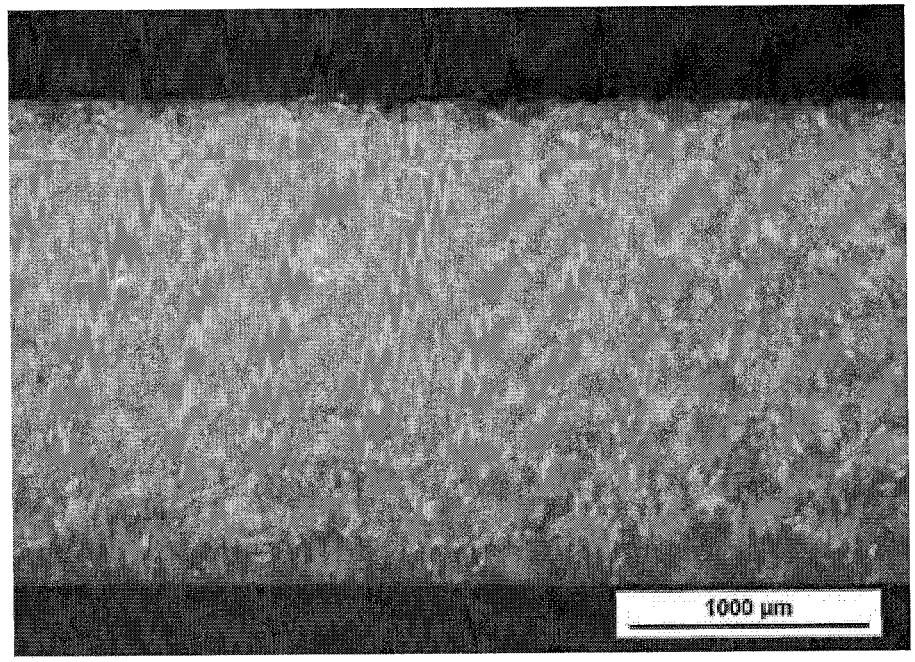

FIG. 6a shows a light microscope image of a cross-section polish of a 2 mm thin injection-molded plate from example no. 8. The main flow direction of the polymer compound during the filling of the injection mold proceeds from left to right. A majority of the scale-like boron nitride agglomerates in the core region of the sample are oriented substantially perpendicular to the plate surface and perpendicular to the main flow direction. The core region having this arrangement of scale-like boron nitride agglomerates is very large and extends in part all the way to the surface of the component part. The core region accounts for more than 70% of the volume of the component part. In the total sample, more than 70% of the scale-like boron nitride agglomerates are oriented toward the surface of the component part at an angle of at least 45°. The PA6 sample containing 50% by volume scale-like boron nitride agglomerates has a through-plane thermal conductivity of 4.1 W/m*K.

Figure 6B:
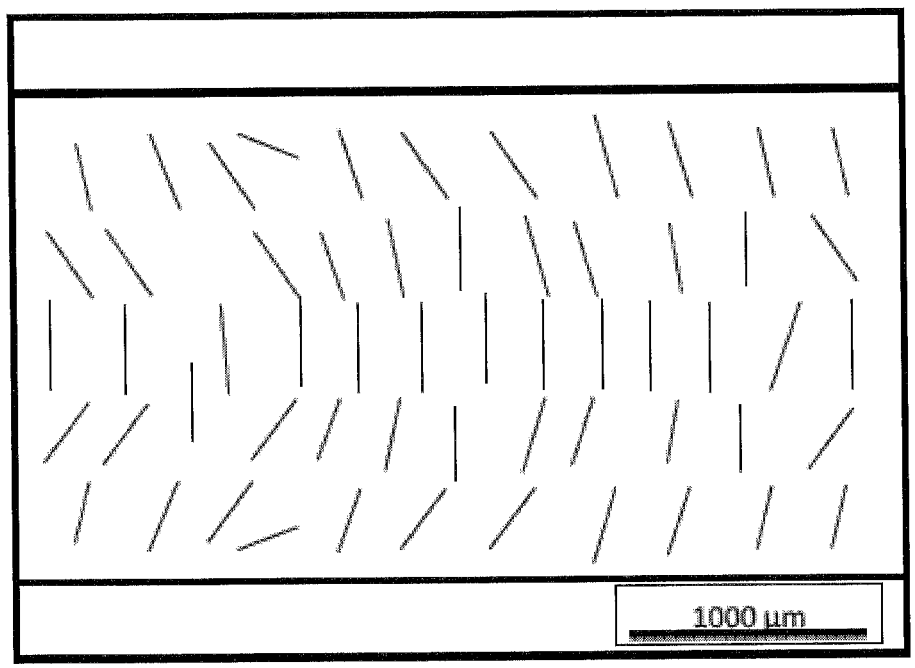

FIG. 6b is a schematic drawing of the orientation of the scale-like boron nitride agglomerates from FIG. 6a.

Figure 7A:
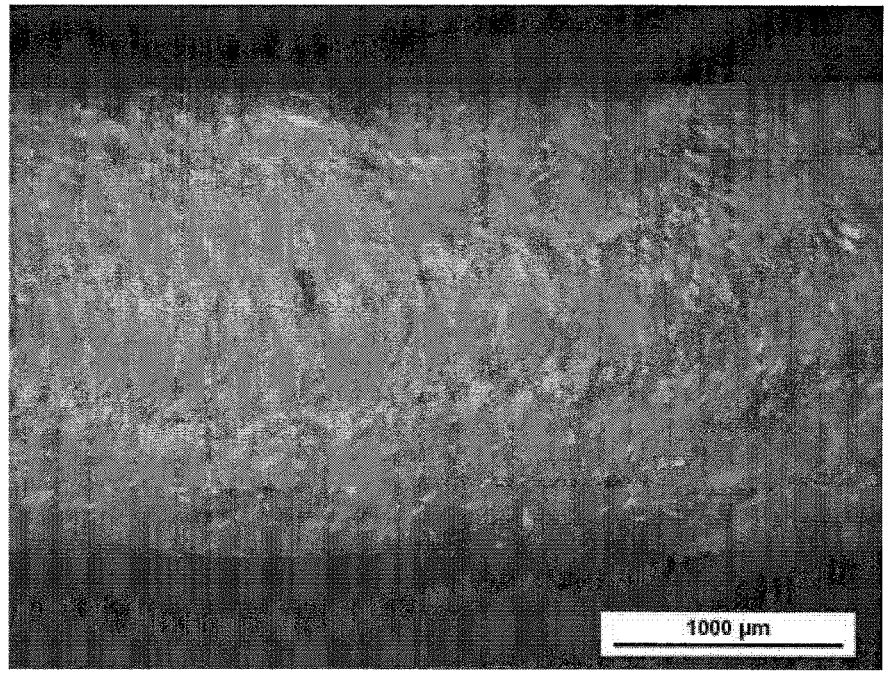

FIG. 7a shows a light microscope image of a cross-section polish of a 2 mm thin injection-molded plate from example no. 11. The main flow direction of the polymer compound during the filling of the injection mold proceeds from left to right. A majority of the scale-like boron nitride agglomerates in the core region of the sample are oriented substantially perpendicular to the plate surface and perpendicular to the main flow direction. The core region accounts for approximately 50% of the volume of the component part. In the total sample, about 50% of the scale-like boron nitride agglomerates are oriented toward the surface of the component part at an angle of at least 45°. The PA6 sample containing 50% by volume scale-like boron nitride agglomerates has a through-plane thermal conductivity of 3.3 W/m*K.

Figure 7B:
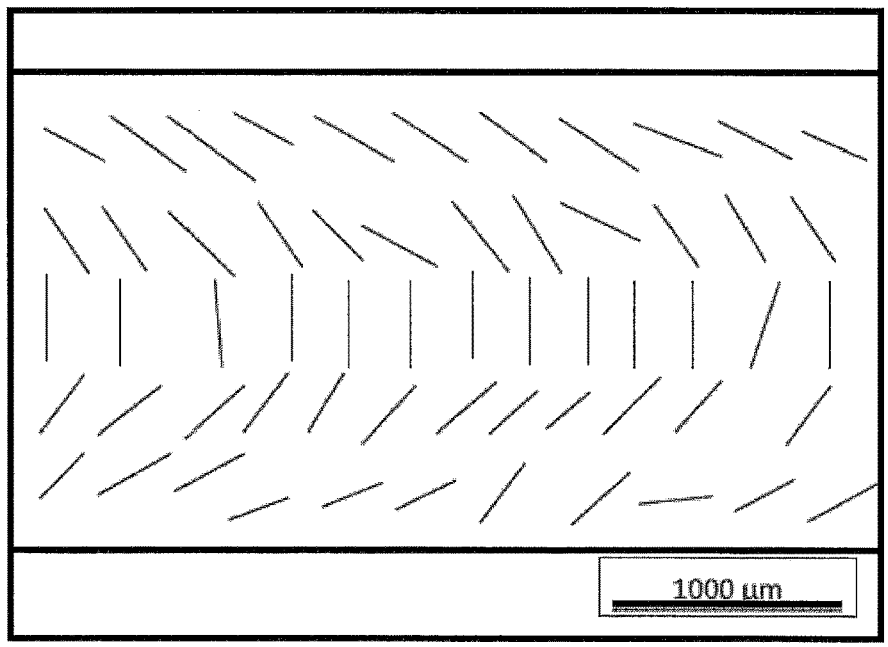

FIG. 7b is a schematic drawing of the orientations of the scale-like boron nitride agglomerates from FIG. 7a.

Figure 8A:
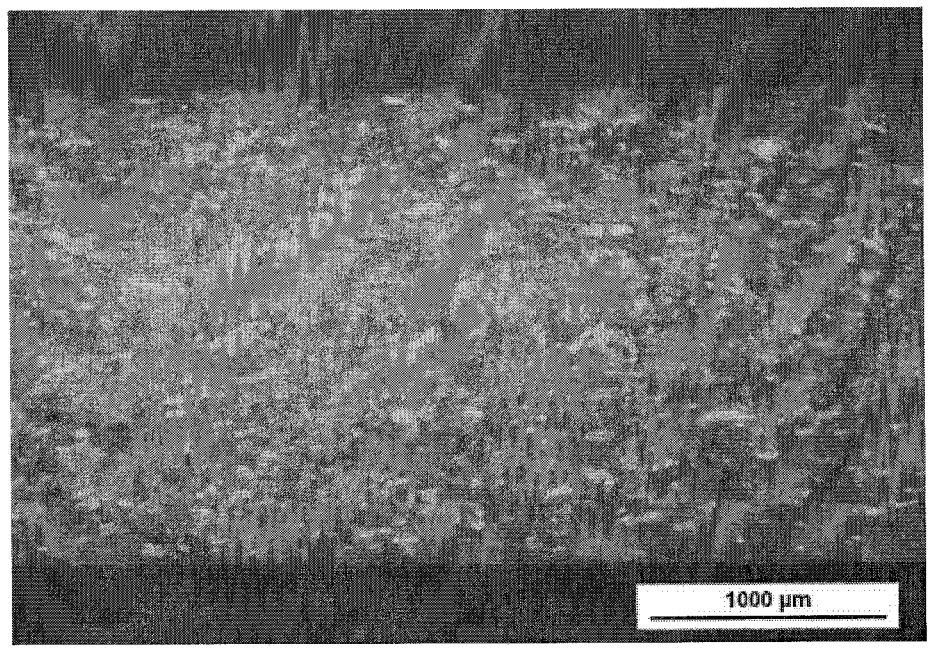

FIG. 8a shows a light microscope image of a cross-section polish of a 2 mm thin injection-molded plate from example no. 12. The main flow direction of the polymer compound during the filling of the injection mold proceeds from left to right. A small proportion of the scale-like boron nitride agglomerates in the core region of the sample is oriented perpendicular to the plate surface and perpendicular to the main flow direction. The core region is relatively small and accounts for about 10 to at most 25% of the volume of the component part. In the total sample, more than 70% of the scale-like boron nitride agglomerates are oriented toward the surface of the component part at an angle of at most 45°. The PA6 sample containing 50% by volume scale-like boron nitride agglomerates has a through-plane thermal conductivity of 3.0 W/m*K.

Figure 8B:
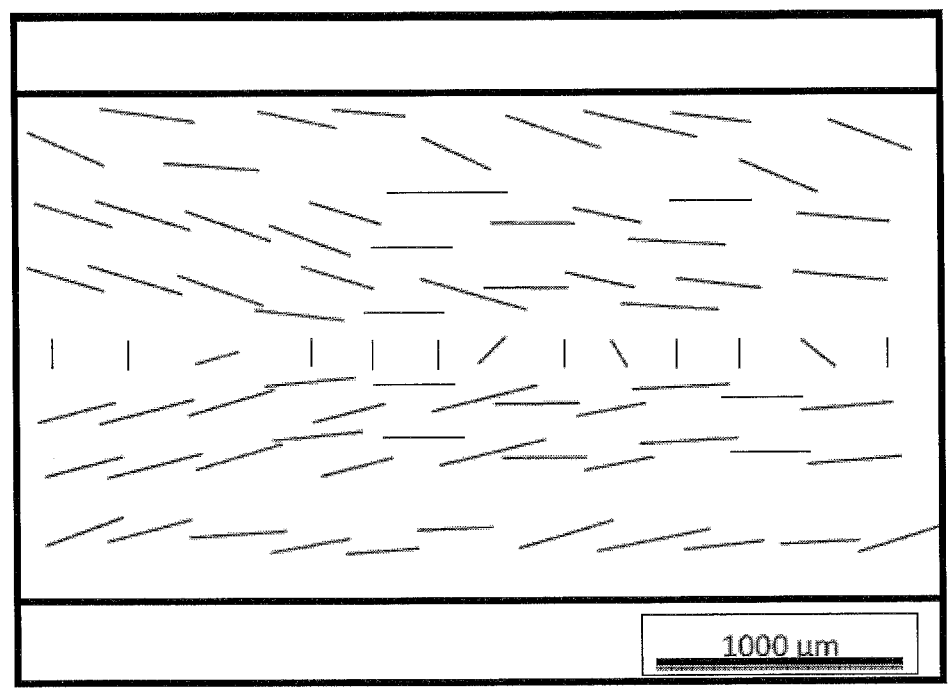

FIG. 8b is a schematic drawing of the orientations of the scale-like boron nitride agglomerates from FIG. 8a.

As already explained above, through-plane thermal conductivity is the thermal conductivity measured in the through-plane direction, that is, perpendicular to the plate plane. In-plane thermal conductivity is the thermal conductivity measured in the in-plane direction, that is, along the plate plane.

The through-plane thermal conductivity of the component parts and polymer/boron nitride compounds according to the invention is preferably at least 1 W/m*K, more preferably at least 1.2 W/m*K, even more preferably at least 1.5 W/m*K and particularly preferably at least 1.8 W/m*K. Thermal conductivity is measured according to DIN EN ISO 22007-4 on disk-shaped injection-molded samples having a thickness of 2 mm.

The in-plane thermal conductivity of the component parts and polymer/boron nitride compounds according to the invention is preferably at least 1.5 W/m*K, more preferably at least 1.8 W/m*K, even more preferably at least 2.2 W/m*K and particularly preferably at least 2.7 W/m*K.

For measuring in-plane thermal conductivity, disk-shaped injection-molded samples having a thickness of 2 mm are stacked one on top of the other and glued together. From the plate stack thus prepared, a 2 mm thin sample having the dimensions of 2×10×10 mm$^3$ is prepared parallel to the through-plane direction and perpendicular to the flow direction of the injection-molded plates. In-plane thermal conductivity is measured according to DIN EN ISO 22007-4 on the 2 mm thick sample thus prepared.

The through-plane thermal conductivity of the component part and polymer/boron nitride compound according to the invention is preferably higher by at least 0.8 W/m*K, more preferably by at least 1 W/m*K, even more preferably by at least 1.3 W/m*K and particularly preferably by at least 1.6 W/m*K than the thermal conductivity of the polymer material without heat-conducting filler.

The in-plane thermal conductivity of the component part and polymer/boron nitride compound according to the invention is preferably higher by at least 1.3 W/m*K, more preferably by at least 1.6 W/m*K, even more preferably by at least 2.0 W/m*K and particularly preferably by at least 2.5 W/m*K than the thermal conductivity of the polymer material without heat-conducting filler.

The proportion of boron nitride in the form of platelet-shaped hexagonal boron nitride particles or boron nitride agglomerates in the component part and polymer/boron nitride compound according to the invention is preferably at least 5% by volume, more preferably at least 10% by volume, even more preferably at least 20% by volume and particularly preferably at least 30% by volume, based on the total volume of the polymer/boron nitride compound.

The proportion of boron nitride in the form of platelet-shaped hexagonal boron nitride particles or boron nitride agglomerates in the component part and polymer/boron nitride compound according to the invention is preferably at most 70% by volume, more preferably at most 60% by volume and particularly preferably at most 50% by volume, based on the total volume of the polymer/boron nitride compound.

Thermoplastically processable polymers are used as polymers for the component part and polymer/boron nitride compound according to the invention. These are in particular the thermoplastic materials polyamide (PA), polyphenylene sulfide (PPS), polycarbonate (PC), polypropylene (PP), thermoplastic elastomers (TPE), thermoplastic polyurethane elastomers (TPU) and polyether ether ketones (PEEK), liquid crystal polymers (LCP) and polyoxymethylene (POM). Duroplastic molding materials, which can be processed thermoplastically, may also be used as polymers. Moreover, rubber, for example synthetic rubber, which can be processed thermoplastically may also be used.

The component part and polymer/boron nitride compound according to the invention contains platelet-shaped hexagonal boron nitride particles, which may exist as non-agglomerated primary particles or even be in the form of boron nitride agglomerates. Well-crystallized hexagonal boron nitride powder is used as the non-agglomerated platelet-shaped, hexagonal primary boron nitride particles. The average particle size $d_{50}$ of the well-crystallized hexagonal boron nitride powder is preferably 3 to 50 µm, but larger platelets may also be used. Mixtures of different hexagonal boron nitride powders with different particle sizes may likewise be used. Measuring the average particle size $(d_{50})$ of the boron nitride powders is typically carried out by means of laser diffraction (wet measurement, Mastersizer 2000, Malvern). If non-agglomerated boron nitride particles are used, the aspect ratio of the platelet-shaped hexagonal boron nitride particles, that is, the ratio of platelet diameter to platelet thickness, is preferably 10 and more. $B_2O_3$-free boron nitride powders and boron nitride powders with low $B_2O_3$ contents of up to 0.5% by weight, but also with higher $B_2O_3$ contents of up to 10% by weight and more, may be used. It is also possible to use mixtures of powdered or granulated boron nitride.

In a preferred embodiment of the component part and polymer/boron nitride compound according to the invention, the platelet-shaped hexagonal boron nitride particles are used in the form of scale-like boron nitride agglomerates. These boron nitride agglomerates are agglomerates comprising platelet-shaped hexagonal primary boron nitride particles which are agglomerated together to form scale-like boron nitride agglomerates. These boron nitride agglomerates may also be referred to as scale-like boron nitride agglomerates or boron nitride flakes. These boron nitride flakes should be distinguished from non-agglomerated platelet-shaped primary boron nitride particles, which are often referred to as "flaky boron nitride particles" in the English-language literature. The structure of the scale-like boron nitride agglomerates is built up from many individual boron nitride platelets. The platelet-shaped primary boron nitride particles in these agglomerates are not randomly oriented toward one another, The scale-like boron nitride agglomerates comprise platelet-shaped primary boron nitride particles, the platelet planes of which are aligned parallel to one another. The platelet-shaped primary boron nitride particles are preferably agglomerated together in such a way that the platelet planes of the primary boron nitride particles are aligned substantially parallel to one another. The scale-like boron nitride agglomerates have anisotropic properties since the platelet-shaped primary boron nitride particles in these agglomerates are not randomly oriented toward one another.

The degree of alignment of the platelet-shaped primary boron nitride particles in the anisotropic scale-like boron nitride agglomerates can be characterized with the texture index. The texture index of hexagonal boron nitride (hBN) with completely isotropic alignment of the platelet-shaped primary boron nitride particles, that is, without a preference in any particular direction, is 1. The texture index rises with the degree of orientation in the sample, that is, the more platelet-shaped primary boron nitride particles are aligned on top of one another or parallel to one another with their basal surfaces, or the more platelet planes of the primary boron nitride particles are aligned parallel to one another. The texture index for the anisotropic scale-like boron nitride agglomerates that are used for the component parts according to the invention preferably lies at values of greater than 2.0, more preferably at 2.5 and more, even more preferably at 3.0 and more and particularly preferably at 3.5 and more. The texture index of the scale-like agglomerates may also have values of 5.0 and more and 10.0 and more. The texture index of the scale-like boron nitride agglomerates preferably lies at values of 200 and less, more preferably at values of 50 and less. The texture index is determined with X-ray diffractometry. To this end, the ratio of the intensities of the (002) and (100) diffraction reflexes is determined by measuring the X-ray diffraction diagrams and divided by the corresponding ratio for an ideal, non-textured hBN sample. This ideal ratio can be determined from the JCPDS data, and it is 7.29.

The texture index (TI) of the boron nitride agglomerates can thus be calculated according to the formula $$TI = \frac{I_{(002),sample} / I_{(100),sample}}{I_{(002),theoretical} / I_{(100),theoretical}} = \frac{I_{(002),sample} / I_{(100),sample}}{7.29}$$

as the ratio $I_{(002)}/I_{(100)}$ of the intensities of the (002) and (100) diffraction reflexes of the X-ray diffraction diagram of the boron nitride agglomerates, divided by the number 7.29. The texture index of the boron nitride agglomerates is measured on a fill of the boron nitride agglomerates. The measurement is carried out at 20° C.

If the texture index is determined on large scale-like individual agglomerates having a size of about 3.5 cm² (based on the area of the top or bottom surface of scale-like agglomerates), very high values of 100 and more and up to about 500 can be obtained for the texture index. These values that are measured on the large scale-like agglomerates are proof of very strong alignment of the primary particles in the scale-like boron nitride agglomerates. When measuring the texture index on the scale-like boron nitride agglomerates that are preferably used for the component parts and polymer/boron nitride compounds according to the invention, which is carried out on an agglomerate fill as already described above, partially static alignment takes place in the sample carrier for the X-ray diffractometric measurement. The texture index values that are obtained on smaller scale-like agglomerates having a size of ≤1 mm is therefore always lower than the corresponding orientation of the primary particles in the individual scale-like agglomerate.

In the polymer/boron nitride compounds and component parts according to the invention, the anisotropic scale-like boron nitride agglomerates that are preferably used have an average agglomerate diameter $(d_{50})$ of ≤1000 µm, more preferably ≤500 µm, even more preferably ≤300 µm and particularly preferably ≤200 µm. The average agglomerate diameter $(d_{50})$ of the anisotropic scale-like boron nitride agglomerates that are used in the polymer/boron nitride compound and the component parts according to the invention is preferably ≥20 µm, more preferably ≥30 µm, even more preferably ≥50 µm and particularly preferably ≥100 µm. The average agglomerate diameter $(d_{50})$ can be determined by means of laser diffraction (wet measurement, Mastersizer 2000, Malvern). The average agglomerate diameter is at least two times greater than the average particle size of the primary boron nitride particles that are used in the agglomerate production, preferably at least three times greater. The average agglomerate diameter may also be ten times or also fifty times or more greater than the average particle size of the primary boron nitride particles that are used in the agglomerate production. The average particle size of the primary particles $(d_{50})$ in the anisotropic scale-like boron nitride agglomerates is ≤50 µm, preferably ≤30 µm, more preferably ≤15 µm, even more preferably ≤10 µm and particularly preferably ≤6 µm.

The thickness of the anisotropic scale-like boron nitride agglomerates is ≤500 µm, preferably ≤200 µm, more preferably ≤100 µm, even more preferably ≤70 µm, still more preferably ≤50 µm and particularly preferably ≤35 µm. The thickness is at least 1 µm, more preferably ≥2 µm, even more preferably ≥3 µm and particularly preferably ≥5 µm. The thickness of the anisotropic scale-like boron nitride agglomerates can be determined using a digital precision gauge or a scanning electron microscope (SEM).

The aspect ratio, i.e. the ratio of agglomerate diameter to agglomerate thickness of the scale-like boron nitride agglomerates can be determined with scanning electron microscope (SEM) images by measuring the diameter and thickness of the agglomerate. The aspect ratio of the scale-like agglomerates has a value of greater than 1, preferably values of 2 and more, more preferably values of 3 and more and particularly preferably values of 5 and more.

The anisotropic scale-like boron nitride agglomerates are boron nitride agglomerates of high density.

Direct contact points exist between the individual platelet-shaped primary boron nitride particles in the anisotropic scale-like boron nitride agglomerates, resulting in continuous heat conduction pathways in the boron nitride agglomerates, built up from primary boron nitride particles.

The scale-like boron nitride agglomerates that are used for the component parts and polymer/boron nitride compounds according to the invention have surfaces on their top and bottom sides that were produced directly by the shaping process and not by comminution. These surfaces are referred to hereafter as "shaped surfaces". The shaped surfaces are comparatively smooth, in contrast to the rough side surfaces (fractured surfaces) of the agglomerates, which were created by fracturing or comminuting steps. The surfaces of the scale-like boron nitride agglomerates are substantially flat (planar), and their top and bottom sides are substantially parallel to one another.

The proportion of the shaped surface in the total surface area of the scale-like boron nitride agglomerates is on average at least 33% (if the diameter of the agglomerate is equal to its height) assuming a platelet or scale shape having a round base, and it is likewise at least 33% (if the agglomerates are cube-shaped) assuming a platelet or scale shape having a square base. For scale-like boron nitride agglomerates having a high aspect ratio, the proportion of the shaped surface in the total surface area is considerably higher; for agglomerates having an aspect ratio >3.0, the proportion is typically between 60 and 95%; for very large agglomerates, the proportion may be even higher. By rounding the agglomerates, or even as a consequence of a sieving or screening process, the proportion of the shaped surface in the total surface area may be reduced; however, the proportion is generally always at least 10%, preferably at least 20%.

The ratio of the shaped surface in the total surface area can be determined by analyzing SEM images. In doing so, the values calculated for agglomerate diameter and thickness are used to determine the aspect ratio. From these values, the proportion of the shaped surface in the total surface area is calculated as follows:

proportion of shaped surface [%]=((2*end face)/total surface area)*100 wherein
end face=agglomerate diameter*agglomerate diameter
total surface area=2*end face+4*side face
side face=agglomerate thickness*agglomerate diameter The scale-like boron nitride agglomerates that are preferably used for the component part and polymer/boron nitride compound according to the invention exhibit high agglomerate stability. Boron nitride agglomerates having high agglomerate stability degrade only partially to primary particles or agglomerate fragments even under the influence of high shear forces, such as those occurring when the polymers are compounded together with the boron nitride fillers, in particular those polymers having high filler loadings. The advantageous properties of the polymer/boron nitride compound according to the invention, in particular the anisotropic ratio, are maintained, despite partial degradation.

The stability of the agglomerates can be tested, for example, in ultrasound experiments while simultaneously measuring the agglomerate size by laser granulometry, wherein the agglomerate disintegrates over time due to the effect of the ultrasound. The disintegration of the agglomerates is recorded via the change in agglomerate size over time, wherein different curves form depending on the stability of the agglomerate. Soft agglomerates disintegrate faster than mechanically more stable agglomerates.

For measuring agglomerate stability, boron nitride agglomerates smaller than 200 µm are broken up, and the fines <100 µm are removed by sieving. On the 100-200 µm sieve fraction thus obtained, agglomerate stability is determined by means of a laser granulometer (Mastersizer 2000 with dispersing unit Hydro 2000S, Malvern, Herrenberg, Germany). To this end, a solution consisting of a wetting agent in water (mixture of 2 mL of a rinsing agent (G 530 Spülfix, BUZIL-Werk Wagner GmbH & Co. KG, Memmingen) and 0.375 mL Imbentin (polyethylene glycol alkyl ether) in 10 L distilled water) is used as the dispersing medium. In a vial with snap-on cap (8 mL), 10-20 mg of the agglomerates is dispersed with 6 mL of the dispersing medium by shaking. Suspension is removed from the sample with a pipette and dropped into the wet cell of the laser granulometer until the laser obscuration reaches 5% (specified range: 5-30%). Measurement starts without ultrasound, and every 15 seconds, a further measurement is taken with ultrasound, in which the ultrasonic power of the dispersing unit (which can be set via the device software to values between 0 and 100%) is set to 5% of the maximum power in each case. A total of ten measurements is taken. When measuring, the stirrer of the dispersing unit runs at 1750 RPM. The quotient of the $d_{90}$ value after the ten measurements and the $d_{90}$ value of the first measurement is used (multiplied by 100 to express in percent) as a measure of agglomerate stability. The measuring method described here is also referred to hereafter as "ultrasound method."

Agglomerate stability for the scale-like boron nitride agglomerates that are preferably used for the polymer/boron nitride compounds according to the invention and the component parts according to the invention is preferably at least 40%, more preferably at least 50% and particularly preferably at least 60%. In this case, agglomerate stability is determined using the above-described ultrasound method.

The specific surface area (BET) of the scale-like boron nitride agglomerates that are preferably used for the polymer/boron nitride compounds according to the invention and the component parts according to the invention is preferably 20 m²/g or less, more preferably 10 m²/g or less.

The scale-like boron nitride agglomerates that are preferably used for the polymer/boron nitride compounds according to the invention and the component parts according to the invention are pourable and easy to dose, in contrast to non-agglomerated boron nitride powders.

When using the same proportion of boron nitride, it is possible to achieve higher thermal conductivity values in the component parts according to the invention having scale-like boron nitride agglomerates than with non-agglomerated boron nitride powders. Using the scale-like boron nitride agglomerates, it is possible to achieve higher filler loadings in polymer/boron nitride compounds and in the component parts produced therefrom, than with non-agglomerated boron nitride powders.

For producing the scale-like boron nitride agglomerates, boron nitride starting powder in the form of primary boron nitride particles or amorphous boron nitride, optionally mixed with binding phase raw materials, is processed into scale-like agglomerates in a shaping step and subsequently subjected to a heat treatments step, a high-temperature annealing, and the obtained scale-like agglomerates are subsequently comminuted and/or fractionated, if necessary.

Shaping the scale-like boron nitride agglomerates is accomplished by compacting the dried or moistened powder mixture by means of uniaxial compression or roller compaction.

For shaping, the boron nitride starting powder or the powder mixture consisting of boron nitride starting powder and binding phase raw materials is preferably compressed between two counter-rotating rollers. In the gap between the rollers, contact forces are set per cm of roll gap length of $\geq 0.5$ kN, preferably $\geq 1$ kN, more preferably $\geq 2$ kN, even more preferably $\geq 3$ kN, still more preferably $\geq 5$ kN, most preferably $\geq 7$ kN and particularly preferably $\geq 10$ kN. The contact force of the rollers influences the density of the anisotropic scale-like boron nitride agglomerates. With high contact forces, a part of the boron nitride raw material is made amorphous, which recrystallizes during the subsequent high-temperature annealing. The production of the anisotropic scale-like boron nitride agglomerates may also take place when using micro-structured rollers.

The residual moisture of the produced agglomerates can be driven out prior to a further temperature treatment or nitridation by drying at approximately 100° C.

The material that is compacted into scale-like agglomerates is subjected to a heat treatment step, a high-temperature annealing. If the scale-like agglomerates are produced without the addition of binding phase raw materials and only using boron nitride starting powders, that is, primary boron nitride particles or amorphous boron nitride, high-temperature annealing of the scale-like agglomerates is carried out at temperatures of at least 1600° C., preferably at least 1800° C.

If necessary, the obtained scale-like agglomerates may subsequently also be further comminuted and/or fractionated.

With increasing contact force during compaction and with increasing temperature during the heat treatment, the stability of the anisotropic scale-like boron nitride agglomerates increases, as does thermal conductivity, measured on thin plates having a thickness of 2 mm which were produced from polymer/boron nitride compounds according to the invention using the anisotropic scale-like boron nitride agglomerates.

When producing the anisotropic scale-like boron nitride agglomerates, boron nitride powders without further additives may be used and processed into the anisotropic scale-like boron nitride agglomerates. Mixtures consisting of hexagonal boron nitride powder and other powders are preferably used, thus producing anisotropic scale-like mixed agglomerates consisting of boron nitride and secondary phases ("boron nitride hybrid flakes"). The powders additionally added to the hexagonal boron nitride powder for producing the anisotropic scale-like mixed agglomerates may be binding phase raw materials for producing an inorganic binding phase. In the anisotropic scale-like mixed agglomerates, the hexagonal primary boron nitride particles are connected to one another by means of an inorganic binding phase as a secondary phase.

The inorganic binding phase of the anisotropic scale-like boron nitride mixed agglomerates comprises at least one carbide, boride, nitride, oxide, hydroxide, metal or carbon.

As in the binding phase-free anisotropic scale-like boron nitride agglomerates, the platelet-shaped primary boron nitride particles are not randomly oriented in these scale-like mixed agglomerates. The scale-like boron nitride mixed agglomerates comprise platelet-shaped primary boron nitride particles, the platelet planes of which are aligned parallel to one another. The platelet-shaped primary boron nitride particles are preferably agglomerated together in such a way that the platelet planes of the primary boron nitride particles are aligned substantially parallel to one another. The scale-like boron nitride mixed agglomerates have anisotropic properties since the platelet-shaped primary boron nitride particles in these agglomerates are not randomly oriented toward one another.

The binding phase is located in the anisotropic scale-like boron nitride mixed agglomerates (boron nitride hybrid flakes) between the primary boron nitride particles, but it may also be located, at least partially, on the surface of the boron nitride hybrid flakes or cover the majority of the surface area. The binding phase binds the primary boron nitride particles in the boron nitride hybrid flakes, making it possible to obtain mechanically more stable agglomerates compared with binder-free agglomerates.

The anisotropic scale-like boron nitride mixed agglomerates preferably have a binding phase proportion of at least 1%, more preferably at least 5%, even more preferably at least 10%, still more preferably at least 20% and particularly preferably at least 30%, in each case based on the total amount of scale-like boron nitride agglomerates.

High-temperature annealing of the scale-like boron nitride agglomerates having an inorganic binding phase is carried out at temperatures of at least 1000° C.

In a further preferred embodiment, the inorganic binding phase of the anisotropic scale-like mixed agglomerates comprises at least one nitride and/or oxynitride. The nitrides or oxynitrides are preferably compounds of the elements aluminum, silicon, titanium and boron.

These boron nitride mixed agglomerates may also be referred to as anisotropic nitride-bonded boron nitride agglomerates or anisotropic boron nitride agglomerates with nitridic binding phase.

The nitrides and oxynitrides contained in the binding phase are preferably aluminum nitride (AlN), aluminum oxynitride, titanium nitride (TiN), silicon nitride ($Si_3N_4$) and boron nitride (BN), more preferably aluminum nitride, aluminum oxynitride, titanium nitride and/or silicon nitride, even more preferably aluminum nitride and/or aluminum oxynitride. The binding phase particularly preferably contains aluminum nitride.

The nitrides and oxynitrides of the binding phase may be amorphous, partially crystalline or fully crystalline. The binding phase is preferably fully crystalline, since this makes it possible to achieve higher thermal conductivity values in the polymer/boron nitride compounds according to the invention and the component parts according to the invention.

The binding phase containing nitrides and/or oxynitrides may additionally also contain oxidic phases such as, for example, boron oxide ($B_2O_3$), aluminum oxide ($Al_2O_3$), silicon dioxide ($SiO_2$), titanium dioxide ($TiO_2$), yttrium oxide ($Y_2O_3$), magnesium oxide (MgO), calcium oxide (CaO) and rare earth metal oxides.

Furthermore, the binding phase may additionally also contain borates, for example aluminum borates or calcium borates. In addition, the binding phase may also contain impurities, for example carbon, metallic impurities, elemental boron, borides, boron carbide or other carbides such as, for example, silicon carbide.

The proportion of nitrides and oxynitrides in the binding phase is preferably at least 50% by weight, particularly preferably at least 80% by weight, based on the total amount of the binding phase.

The binding phase preferably contains aluminum nitride, silicon nitride or titanium nitride or mixtures thereof in a proportion of ≥50% by weight, based on the total amount of the binding phase. The binding phase particularly preferably contains aluminum nitride, preferably in a proportion of ≥90% by weight, based on the total amount of the binding phase.

Metal powders are preferably used as binding phase raw materials for producing the nitridic binding phase of the anisotropic nitride-bonded boron nitride agglomerates, which metal powders are converted, by direct nitridation, into the corresponding metal nitride or an oxynitride or mixtures of metal nitrides and oxynitrides. The metal powders that are used are preferably aluminum, silicon or titanium powders or mixtures thereof. Aluminum powder is used with particular preference. In the nitriding step, the metal is converted into the corresponding metal nitride. It is also possible that oxynitrides or mixtures of metal nitrides and oxynitrides form during nitridation.

Metal compounds in combination with reducing agents may also be used as binding phase raw materials for producing the nitridic binding phase of the anisotropic nitride-bonded boron nitride agglomerates, the nitridic binding phase being produced via reduction-nitridation. The metal compounds used are preferably compounds of the elements aluminum, silicon and titanium, preferably oxides and/or hydroxides such as, for example, aluminum oxide ($Al_2O_3$), aluminum hydroxide ($Al(OH)_3$), boehmite (AlOOH), silicon dioxide ($SiO_2$) and titanium dioxide ($TiO_2$). The metal compounds used may also be borates, for example aluminum borate. Carbon and hydrogen as well as organic compounds such as, for example, polyvinyl butyral (PVB), melamine and methane may be used as reducing agents. If gaseous substances such as, for example, hydrogen or methane are used as reducing agents, these substances are added to the nitriding atmosphere. The reducing agent necessary for the reduction may also already exist in the metal compound, thus making the use of additional reducing agents unnecessary, for example when using aluminum isopropoxide, tetraethylorthosilicate or titanium isopropoxide as binder raw materials. In the nitriding step, the metal compounds are converted into the corresponding metal nitrides. It is also possible that oxynitrides or mixtures of metal nitrides and oxynitrides form during nitridation; likewise, the binding phase may still contain residues of unreacted oxides.

Reactants for producing boron nitride may also be used as binding phase raw materials for producing the nitridic binding phase of the anisotropic nitride-bonded boron nitride agglomerates. The reactants for producing boron nitride may contain an oxidic boron source such as, for example, boric acid ($H_3BO_3$) and boron oxide ($B_2O_3$) in combination with a reducing agent such as, for example, carbon or hydrogen or organic compounds such as polyvinyl alcohol (PVA), polyvinyl butyral (PVB), melamine and methane. If gaseous substances such as, for example, hydrogen or methane are used as reducing agents, these substances are added to the nitriding atmosphere. Substantially oxygen-free boron sources such as, for example, elemental boron, boron carbide and trimethyl borate may also be used as reactants for producing boron nitride. In the nitriding step, these raw materials are converted to hexagonal boron nitride.

The binding phase raw materials used for producing the nitridic binding phase of the anisotropic nitride-bonded boron nitride agglomerates may also be nitridic materials which solidify during the heat treatment in the nitriding atmosphere. The nitridic material may be a nitride and/or oxynitride compound of aluminum or silicon, but titanium nitride and rare earth nitrides may also be used; likewise, compounds from the group consisting of sialons. Liquid phases such as, for example, yttrium oxide, aluminum oxide, magnesium oxide, calcium oxide, silicon oxide and rare earth oxides may be used as sintering aids.

It is also possible to use mixtures of the different binding phase raw materials listed.

Hexagonal boron nitride, amorphous boron nitride, partially crystalline boron nitride and mixtures thereof may be used as the boron nitride starting powder for producing the anisotropic scale-like boron nitride agglomerates.

The average particle size $d_{50}$ of the boron nitride powder that is used may be 0.5-50 µm, preferably 0.5-15 µm, more preferably 0.5-5 µm. For instance, hexagonal boron nitride powders having an average particle size of 1 µm, 3 µm, 6 µm, 9 µm and 15 µm may be used, but greater average particle sizes of up to 50 µm are also possible. Mixtures of different hexagonal boron nitride powders having different particle sizes may likewise be used.

Measuring the average particle size ($d_{50}$) of the boron nitride powders that are used is typically carried out by means of laser diffraction (wet measurement, Mastersizer 2000, Malvern).

$B_2O_3$-free boron nitride powders and boron nitride powders with lower $B_2O_3$ contents of up to 0.5% by weight, but also with higher $B_2O_3$ contents of up to 10% by weight and more, may be used. It is also possible to use mixtures of powdered or granulated boron nitride. The binding phase raw materials may be present in solid or liquid or paste-like form.

Mixing boron nitride starting powder and binding phase raw materials may be carried out in a mixing drum, in a V-mixer, a drum hoop mixer, a vibrating mill or an Eirich mixer, for example. Homogeneity may be further increased in a subsequent milling step (e.g. cross beater mill, tumbling mill, agitator ball mill). The powder mixture may be dry or moistened. It is likewise possible to add pressing aids and, if necessary, lubricating aids. Mixing may also be carried out wet, for example, if the subsequent production of the granules is carried out via spray-drying or build-up granulation.

The material compacted into scale-like agglomerates is subsequently subjected to high-temperature annealing in a nitriding atmosphere at temperatures of at least 1600° C., preferably at least 1800° C. The nitriding atmosphere preferably comprises nitrogen and/or ammonia. The nitriding atmosphere preferably additionally contains argon. After achieving the maximum temperature, a dwell time of up to several hours or days can be held. The temperature treatment may be carried out in a continuous or batch-wise method.

Due to the temperature treatment in the nitriding atmosphere, a nitridic binding phase forms as a secondary phase which connects the primary boron nitride particles to one another. Due to the nitriding step, the degree of crystallization of the primary particles may increase, which is accompanied by primary particle growth.

The remainder of raw materials unreacted during nitridation in the binding phase in the anisotropic nitride-bonded boron nitride mixed agglomerates is preferably ≤10%, more preferably ≤5%, even more preferably ≤3% and particularly preferably ≤2%. The contamination with oxygen is preferably ≤10%, more preferably ≤5%, even more preferably ≤2% and particularly preferably ≤1%.

Prior to the high-temperature treatment, the material compacted into scale-like agglomerates is preferably subjected to a further temperature treatment at a temperature of at least 700° C. in a nitriding atmosphere, wherein the temperature of this first temperature treatment is below the temperature of the high-temperature treatment. The nitriding atmosphere of this pre-nitridation preferably comprises nitrogen and/or ammonia. The nitriding atmosphere preferably additionally contains argon.

With rising temperature and duration of the temperature treatment, the degree of crystallization increases in the primary boron nitride particles contained in the scale-like boron nitride mixed agglomerates, and the oxygen content and specific surface area of the primary boron nitride particles that are present decreases.

To achieve the target agglomerate size of the scale-like boron nitride agglomerates, customary steps such as sieving, comminution sieving and screening may be taken. If fines are contained, they may be removed first. As an alternative to sieving, the defined comminution of the agglomerates may also be carried out with sieve graters, classifier mills, structured roller crushers or cutting wheels. Milling, for instance in a ball mill, is also possible. The agglomerates of several millimeters to several centimeters in size are processed in a further process step into defined agglomerate sizes. To this end, standard commercial sieves having different mesh sizes and sieving aids on a vibrating sieve may be used, for example. A multi-step sieving/comminution sieving process has proven to be advantageous.

Following their production, the anisotropic scale-like boron nitride agglomerates may be subjected to further treatments. In this case, for example, one or more of the following possible treatments may be carried out:
 a steam treatment
 a surface modification with silanes, titanates or other organometallic compounds, either at room temperature or under the influence of temperature and with carrier or reaction gases. This surface modification also increases the resistance to hydrolysis of the nitridic binding phase in the case of the nitride-bonded scale-like agglomerates.
 a surface modification with polymers, for example with polyethylene glycol (PEG), polyvinyl alcohol (PVA), polyvinyl butyral (PVB), polyvinyl pyrrolidone (PVP), copolymers, acrylates, oils or carboxylic acids.
 an infiltration with sol-gel systems, for example with boehmite sol or $SiO_2$ sol, or with water-soluble glasses or nanoparticles or surface-modified nanoparticles or mixtures thereof.
 an infiltration with water-soluble or ethanol-soluble polymers. The boron nitride agglomerates may be infiltrated with resins such as, for example, silicon, epoxy or polyurethane resins, and the resin may be hardened with hardener or be temperature-hardened before or during compounding.
 in the case of nitride-bonded scale-like agglomerates, a temperature treatment under oxygen, which leads to a superficial oxidation of the anisotropic nitride-bonded boron nitride agglomerates. For instance, agglomerates with superficial $TiO_2$ can be produced with a binding phase containing titanium nitride (TiN) by oxidation in air above at 500° C.; superficial $SiO_2$ can be produced with a binding phase containing silicon nitride ($Si_3N_4$), and superficial aluminum oxide ($Al_2O_3$) can be produced with a binding phase containing aluminum nitride (AlN). For anisotropic nitride-bonded boron nitride agglomerates containing AlN as the binding phase, a temperature treatment in air can be carried out, preferably at temperatures of 500° C. and higher, more preferably at temperatures between 700° C. and 1200° C. and particularly preferably at temperatures between 700° C. and 1000° C.

The listed surface treatments may also be carried out for mixtures of anisotropic nitride-bonded boron nitride agglomerates with other boron nitride fillers such as, for example, primary boron nitride particles.

It is also possible to combine several of the listed treatments in any order. For example, the treatments may be carried out in a fluidized bed method.

With the listed treatments, it is possible to achieve an improved coupling of the polymer matrix to the scale-like boron nitride agglomerates in the polymer/boron nitride compound according to the invention.

The anisotropic nitride-bonded boron nitride agglomerates exhibit excellent mechanical stability. The mechanical stability of the boron nitride agglomerates is important since it must withstand (if possible with only minimal disintegration) filling, transporting, dosing, compounding, that is, further processing of the boron nitride agglomerates into polymer/boron nitride compounds, and subsequent molding by injection molding. Should the boron nitride agglomerates disintegrate during compounding, the danger exists that the rheological properties of the polymer/boron nitride compounds worsen and thermal conductivity decreases in the through-plane direction in the component parts produced from the compounds, in particular in injection-molded thin plates. There is a risk that the boron nitride agglomerates degrade to the point that thermal conductivity in the through-plane direction is lowered so far that it sinks to a level comparable to that of polymer compounds produced with the use of primary boron nitride particles.

With the anisotropic scale-like boron nitride agglomerates and the anisotropic nitride-bonded boron nitride agglomerates, thermal conductivity in the polymer/boron nitride compounds according to the invention is not as directionally dependent as in polymer/boron nitride compounds produced with the use of platelet-shaped primary boron nitride particles. The anisotropic scale-like boron nitride agglomerates and the anisotropic nitride-bonded boron nitride agglomerates exhibit such high strength that they survived the compounding process with a polymer melt in great number and size.

Surprisingly, through-plane thermal conductivity of polymer/boron nitride compounds can be increased about two-fold with a filler loading of 30% by volume and about four-fold with a filler loading of 50% by volume with the anisotropic nitride-bonded boron nitride agglomerates using the production method according to the invention, compared with the use of non-agglomerated platelet-shaped boron nitride using standard injection molding parameters.

Surprisingly, through-plane thermal conductivity of 2 mm thin injection-molded plates can be increased by about 40% with a filler loading of 30% by volume and by about 100% with a filler loading of 50% by volume with the anisotropic nitride-bonded boron nitride agglomerates using the production method according to the invention, compared with the use of standard injection molding parameters, in particular with the use of gentle compounding parameters.

The anisotropic scale-like boron nitride agglomerates and the scale-like boron nitride agglomerates with inorganic binding phase are stable enough to be used in the compounding and injection molding of thin plates having a wall thickness of about 2 mm. If the wall thickness of thin plates, in which an even higher stability of the agglomerates is necessary, is further reduced, an adjustment to the stability requirements can take place in each case by increasing the proportion of the binding phase in the scale-like boron nitride agglomerates with inorganic binding phase.

It is also advantageous that, by adjusting or increasing the stability of the scale-like boron nitride agglomerates with inorganic binding phase, mixtures with abrasive secondary fillers are also possible. In mixtures of boron nitride agglomerates with abrasive secondary fillers, customary boron nitride agglomerates are degraded. In the boron nitride agglomerates that are used according to the invention, degradation is reduced to the degree that the advantageous thermal conductivity properties are maintained.

It is furthermore of advantage that the stability of the scale-like boron nitride agglomerates with inorganic binding phase can be adjusted by increasing the proportion of binding phase, in particular in the case of high filler contents, in which melt viscosity during thermoplastic processing is high and where thus high shear of the filler takes place, and that processing of high filler contents or high contents of filler mixtures are therefore possible.

Owing to the adjustability of the stability of the anisotropic scale-like boron nitride agglomerates and the scale-like boron nitride agglomerates with inorganic binding phase, a good compromise can be reached between the abrasiveness of the heat-conductive filler and adequate stability for each application.

In a further preferred embodiment, the component part and polymer/boron nitride compound according to the invention may additionally also contain at least one filler as a heat-conducting filler which is different from boron nitride and which increases thermal conductivity, in addition to boron nitride in the form of platelet-shaped hexagonal boron nitride particles or boron nitride agglomerates. These additional fillers are also referred to hereafter as secondary fillers.

The thermal conductivity of such secondary fillers is typically ≥5 W/m*K, preferably ≥8 W/m*K.

The total proportion of boron nitride in the form of boron nitride agglomerates or platelet-shaped hexagonal boron nitride particles and secondary fillers in the component part and polymer/boron nitride compound according to the invention is preferably at least 20% by volume, more preferably at least 30% by volume, based on the total volume of the polymer/boron nitride compound in each case. The total proportion of boron nitride in the form of boron nitride agglomerates or platelet-shaped hexagonal boron nitride particles and secondary fillers in the component part and polymer/boron nitride compound according to the invention is preferably at most 70% by volume, more preferably at most 60% by volume, based on the total volume of the polymer/boron nitride compound in each case. The total proportion of boron nitride in the form of boron nitride agglomerates or platelet-shaped hexagonal boron nitride particles and secondary fillers in the component part and polymer/boron nitride compound according to the invention is particularly preferably at most 50% by volume, based on the total volume of the polymer/boron nitride compound in each case.

Metal powders and alloys, preferably selected from the group comprising aluminum, silicon, titanium, copper, iron and bronze powders and mixtures thereof may be used as secondary fillers.

The secondary filler used may also be carbon in the form of graphite, expanded graphite, graphene or carbon black, expanded graphite being particularly preferred.

The secondary fillers used may furthermore be ceramic fillers such as oxides, nitrides and carbides, preferably selected from the group comprising aluminum oxide, magnesium oxide, aluminum nitride, silicon dioxide, silicon carbide, silicon nitride and mixtures thereof, particularly preferably aluminum oxide, magnesium oxide and/or aluminum nitride.

The secondary fillers used may also be mineral fillers, preferably selected from the group comprising aluminosilicates, aluminum silicates, magnesium silicate ($2MgO*SiO_2$), magnesium aluminate ($MgO*Al_2O_3$), brucite (magnesium hydroxide, $Mg(OH)_2$), quartz, cristobalite and mixtures thereof. The aluminosilicates or aluminum silicates used may be, for example, kyanite ($Al_2SiO_5$) and/or mullite ($3Al_2O_3*2SiO_2$).

Combinations of secondary fillers are also possible. A combination of anisotropic nitride-bonded boron nitride agglomerates, aluminosilicate and expanded graphite as heat-conducting fillers has proven particularly advantageous in the component part and polymer/boron nitride compound according to the invention.

It is preferred that the secondary fillers are present in particulate form. The shape of the secondary filler particles may be irregular, blocky or spherical, or platelet-shaped. The proportion of platelet-shaped secondary fillers in the component part and polymer/boron nitride compound according to the invention is preferably not more than 10% by volume, more preferably not more than 5% by volume.

The secondary fillers preferably have a particle diameter or platelet diameter of ≥0.5 µm, more preferably ≥1 µm, even more preferably ≥2 µm and particularly preferably ≥5 µm.

The secondary filler is present as a powder, preferably an agglomerated powder. The agglomeration of the secondary filler may be carried out via roller compaction or build-up granulation, for example in an Eirich mixer. A PVA solution may be used as the granulating agent. During compounding, the secondary filler granules are preferably mixed with the boron nitride filler in the extruder prior to dosing. The secondary filler granules are dried prior to mixing the secondary filler granules with the boron nitride filler. Granulating the secondary filler facilitates uniform dosing during compounding.

When using filler combinations of boron nitride agglomerates or primary boron nitride particles and secondary fillers, the anisotropic scale-like boron nitride agglomerates are preferably used in combination with secondary fillers.

The thermal conductivity of the component parts and polymer/boron nitride compounds according to the invention with filler combinations of scale-like boron nitride agglomerates and secondary fillers is higher than that of polymer compounds produced with the use of secondary fillers alone, in each case using the same proportion of fillers in the total volume.

Surprisingly, the combination of scale-like boron nitride agglomerates with the secondary fillers shows that the achieved thermal conductivity values of the polymer/boron nitride compounds according to the invention that are produced with the filler combinations are higher than would have been expected if the thermal conductivity values for the polymer materials that are individually filled with the corresponding proportions of boron nitride agglomerates and secondary fillers (in each case minus the thermal conductivity of the unfilled base polymer) had been added. This applies both to in-plane thermal conductivity and through-plane thermal conductivity.

In addition to the preferably used scale-like boron nitride agglomerates, the component parts and polymer/boron nitride compounds according to the invention may also contain primary boron nitride particles. Likewise, primary boron nitride particles may additionally be used in the polymer/boron nitride compounds produced using filler combinations of boron nitride agglomerates and secondary fillers. The primary boron nitride particles used may be boron nitride powders, but also less stable boron nitride agglomerates such as, for example, spray-dried boron nitride agglomerates, which are largely or completely degraded to primary particles during compounding. The proportion of additional primary boron nitride particles in the polymer/boron nitride compound according to the invention is preferably ≤20% by volume, particularly preferably ≤10% by volume.

In addition to the boron nitride agglomerates or the boron nitride agglomerates and secondary fillers having a thermal conductivity of ≥5 W/m*K, the component parts and polymer/boron nitride compounds according to the invention may also contain additional fillers different from boron nitride having a lower thermal conductivity of <5 W/m*K such as, for example, talc.

In addition to heat-conducting fillers, the component parts and polymer/boron nitride compounds according to the invention may also contain additional additives and fillers which assume other functions such as, for example, adjusting the mechanical or electrical properties or the coefficient of thermal expansion. In this, the fillers may be present, for instance, as blocky, spherical, platelet-shaped, fibrous particles, or as particles having an irregular morphology.

Glass fibers, in particular, may be used as additional fillers in the component parts and polymer/boron nitride compounds according to the invention, to improve mechanical properties, in particular strength. In doing so, standard commercial glass fibers may be used to reinforce thermoplastic polymers. The glass fibers may also contain surface modifiers. The diameter of the glass fibers may be 14 µm, the length of the glass fibers may be 4.5 mm, for example. Other diameters and lengths are also possible. Silanization may be carried out as the surface modification, but other surface modifications are also possible.

The content of glass fibers in the polymer/boron nitride compounds is preferably 5-40% by volume.

For producing the component parts and polymer/boron nitride compounds according to the invention, mixtures of different fractions of anisotropic scale-like boron nitride agglomerates may also be used.

The polymer/boron nitride compounds according to the invention can be produced by compounding, using any of the common compounding aggregates. This includes, inter alia, single-screw extruders, twin-screw extruders, tangential or closely intermeshing co- or counter-rotating, planetary roller extruders, grooved barrel extruders, pin-type extruders, calendaring, Buss co-kneaders, shearing roller extruders and injection molding machines. Compounding in twin-screw extruders is preferred.

The polymer that is used for compounding may be present in powder form or in the form of granules. The polymer may be premixed in dry form with the boron nitride agglomerates or with the boron nitride agglomerates and further fillers before the mixture is supplied to a compounding aggregate. Alternatively, the addition of the boron nitride agglomerates and optionally further fillers to the polymer melt may be carried out via side feeders without first premixing the filler with the polymer. Furthermore, master batches, that is, polymer compounds having high filler contents, can be produced, and granule mixtures of the master batches may be injection-molded in an injection molding machine.

Compounding the polymer/boron nitride compounds according to the invention is preferably carried out under conditions that are as gentle as possible. The delivery rate of the extruder should preferably be set to at most 50% of the maximum delivery rate. The screw speed should preferably be at most 300 RPM. After adding the boron nitride agglomerates via a side feeder, it is preferred that only conveying elements and mixing elements are installed in the screws of the twin-screw extruder, but no kneading blocks, shearing elements or backflow elements.

After homogenizing in the compounding aggregate, the filled polymer melt is granulated. Granulating the polymer/boron nitride compound may be carried out, for example, via strand granulation, underwater granulation, hot pelletization or cold pelletization. A combination of the methods for processing the compound is also possible. The obtained polymer/boron nitride compound in granulate form can be further processed via shaping methods such as, for example, injection molding to form component parts.

The component parts according to the invention are produced by thermoplastically processing the polymer/boron nitride compounds. The polymer/boron nitride compounds can be shaped into any desired shape, for example by injection molding, extruding, calendaring or injection stamping, preferably by injection molding or extruding. Processing by injection molding is particularly preferred. To this end, for example, the compound granules or compound granule mixture from master batches can be melted in a hydraulically or electromechanically driven plasticization unit and, if necessary, may also be homogenized with additional fillers or polymers until it leaves the nozzle. During the subsequent injection phase, the melt may be injected into the closed mold of an injection molding machine. In doing so, both classic injection molds and molds having hot runner systems may be used. After the cavity is completely filled, the holding pressure can be held constant until the component part is completely solidified. After the cooling time has elapsed, the mold can be opened and the component part can be ejected. Ejection, in turn, may be carried out by the ejecting unit of the injection molding machine or by other ways of removal, such as robotic arms.

As explained above, the component parts according to the invention are produced with a method comprising the method step of injection molding by means of an injection mold in an injection molding machine using a polymer/boron nitride compound according to the invention, wherein the injection rate is ≤200 mm/s. The injection rate is preferably ≤175 mm/s and particularly preferably ≤150 mm/s.

For polymer/boron nitride compounds containing no glass fibers and whose through-plane thermal conductivity lies in the medium heat-conducting range, i.e. in the range of from 1 to <2.5 W/m*K, the injection rate is ≤200 mm/s, preferably ≤175 mm/s, more preferably ≤150 mm/s, even more preferably ≤125 mm/s, still more preferably ≤100 mm/s, most preferably ≤80 mm/s and particularly preferably ≤70 mm/s.

For polymer/boron nitride compounds containing no glass fibers and the through-plane thermal conductivity of which lies in the range of from 1 to <2.5 W/m*K, a temperature is selected for the melt temperature of the compound melt in the injection molding machine which is at least 10° C., more preferably at least 20° C. and particularly preferably at least 30° C. above the melting temperature of the polymer material without heat-conducting filler. The melt temperature of the compound melt in the injection molding machine is preferably at most 60° C., more preferably at most 50° C. and particularly preferably at most 40° C. above the melting temperature of the polymer material without heat-conducting filler.

The mold temperature of the injection mold for compounds containing no glass fibers and the thermal conductivity of which ranges from 1 W/m*K to <2.5 W/m*K, is preferably set such that it is at least 30° C., more preferably at least 60° C. and particularly preferably at least 90° C. below the heat deflection temperature of the polymer material without heat-conducting filler, measured at 0.45 MPa according to DIN EN ISO 75-1/-2. The mold temperature of the injection mold is preferably at most 120° C. and particularly preferably at most 100° C. below the heat deflection temperature of the polymer material without heat-conducting filler, measured at 0.45 MPa according to DIN EN ISO 75-1/-2.

For example, in a glass fiber-free compound with a low-viscosity polyamide 6 and with a thermal conductivity ranging from 1 W/m*K to <2.5 W/m*K, the melt temperature of the compound melt in the injection molding machine is preferably at least 229° C., more preferably at least 239° C., even more preferably at least 249° C. Furthermore, the melt temperature of the compound melt with polyamide 6 is preferably at most 279° C., more preferably at most 269° C., even more preferably at least 259° C. The mold temperature of the injection mold is preferably at most 160° C., more preferably at most 130° C., even more preferably at most 110° C., and it is preferably at least 70° C., more preferably at least 90° C. Polyamide 6 has a melting point of 219° C.; the heat deflection temperature for polyamide 6 measured at 0.45 MPa according to DIN EN ISO 75-1/-2 is 190° C.

For polymer/boron nitride compounds containing no glass fibers and the through-plane thermal conductivity of which is in the high heat-conducting range of ≥2.5 W/m*K, the injection rate during injection molding is ≤200 mm/s, preferably ≤175 mm/s, more preferably ≤150 mm/s, even more preferably ≤125 mm/s, still more preferably ≤100 mm/s, most preferably ≤80 mm/s and particularly preferably ≤70 mm/s.

For polymer/boron nitride compounds containing no glass fibers and the through-plane thermal conductivity of which is in the high heat-conducting range of ≥2.5 W/m*K, a temperature is selected for the melt temperature of the compound melt in the injection molding machine which is preferably at least 10° C., more preferably at least 20° C. above the melting temperature of the polymer material without heat-conducting filler. The melt temperature of the compound melt in the injection molding machine is preferably at most 60° C., more preferably at most 50° C., even more preferably at most 40° C. and particularly preferably at most 35° C. above the melting temperature of the polymer material without heat-conducting filler.

The mold temperature of the injection mold for compounds containing no glass fibers and having a thermal conductivity ≥2.5 W/m*K, is preferably set such that it is at least 5° C., more preferably at least 10° C. below the heat deflection temperature of the polymer material without heat-conducting filler, measured at 0.45 MPa according to DIN EN ISO 75-1/-2. The mold temperature of the injection mold is preferably at most 70° C., more preferably at most 50° C. and particularly preferably at most 40° C. below the heat deflection temperature of the polymer material without heat-conducting filler, measured at 0.45 MPa according to DIN EN ISO 75-1/-2.

For example, in a glass fiber-free compound with a low-viscosity polyamide 6 and with a thermal conductivity of ≥2.5 W/m*K, the melt temperature of the compound melt in the injection molding machine is preferably at least 229° C., more preferably at least 239° C. Furthermore, the melt temperature of the compound melt with polyamide 6 is preferably at most 279° C., more preferably at most 269° C., even more preferably at most 254° C. The mold temperature of the injection mold is preferably at most 185° C. and more preferably at most 180° C.; it is preferably at least 120° C., more preferably at least 140° C. and particularly preferably at least 150° C.

For polymer/boron nitride compounds containing no glass fibers, it is possible to first produce a preliminary sample for determining the through-plane thermal conductivity range.

Producing the preliminary sample for determining the through-plane thermal conductivity range of glass fiber-free polymer/boron nitride compounds is preferably carried out in the following steps:

1) Producing Master Batches a) A polymer compound containing boron nitride agglomerates as filler is produced as the master batch. The filler concentration in the master batch is up to 50% by volume and may also be higher in particularly low-viscosity polymers. Compounding is carried out using the temperature profile recommended by the manufacturer for each polymer. Compounding is carried out in twin-screw extruders having a side feeder for the filler. In the screw configurations of the twin-screw extruder, only conveying and mixing elements are used downstream of the point of where the filler is added, in order for the filler to experience shear that is as mild as possible until it is discharged from the twin-screw extruder. During compounding, the delivery rate of the extruder is preferably set to at most 50% of the maximum delivery rate. The screw speed is set to 300 RPM. Granulation may be carried out via hot pelletizing, under water or following a water bath in a shredder.

b) If glass fibers are used to improve mechanical properties, a master batch is produced for the glass fiber filler according to the procedure described under a) for the boron nitride agglomerate filler.

c) If other fillers are also used in addition to boron nitride agglomerates and the optionally present glass fibers, further master batches are produced for these fillers according to the procedure described under a).

2) Producing a Granule Mixture

The master batches produced in step 1) are homogenized together in the ratio of the desired composition by mixing them for 2 minutes in a tumbling mixer. The amount of the produced mixture is at most 5 kg.

3) Injection Molding

A granule mixture is injection-molded to form 2 mm thin plates in an injection molding machine, using the above-mentioned parameters for high heat-conductive compounds.

4) Measuring Thermal Conductivity

A $2*10*10$ mm$^3$ sample is prepared from the center of an injection-molded plate. Measuring through-plane thermal conductivity is carried out on this sample using the flash method according to DIN EN ISO 22007-4.

For polymer/boron nitride compounds additionally containing glass fibers to improve mechanical properties, the injection rates during injection molding are ≤200 mm/s, preferably ≤175 mm/s and particularly preferably ≤150 mm/s. For polymer/boron nitride compounds containing glass fibers, the injection rate is preferably at least 50 mm/s, more preferably at least 70 mm/s.

For polymer/boron nitride compounds additionally containing glass fibers to improve mechanical properties, a temperature is selected for the melt temperature of the compound melt in the injection molding machine which is at least 10° C., more preferably at least 20° C. and particularly preferably at least 30° C. above the melting temperature of the polymer material without heat-conducting filler. The melt temperature of the compound melt in the injection molding machine is preferably at most 60° C., more preferably at most 55° C. above the melting temperature of the polymer material without heat-conducting filler.

The mold temperature of the injection mold for compounds containing glass fibers is preferably set such that it is at least 5° C., more preferably at least 10° C. below the heat deflection temperature of the polymer material without heat-conducting filler, measured at 0.45 MPa according to DIN EN ISO 75-1/-2. The mold temperature of the injection mold is preferably at most 40° C., more preferably at most 30° C. and particularly preferably at most 25° C. below the heat deflection temperature of the polymer material without heat-conducting filler, measured at 0.45 MPa according to DIN EN ISO 75-1/-2.

For example, in a glass fiber-free compound with a low-viscosity polyamide 6, the melt temperature of the compound melt in the injection molding machine is preferably at least 229° C., more preferably at least 239° C., even more preferably at least 249° C. Furthermore, the melt temperature of the compound melt with polyamide 6 is preferably at most 279° C., more preferably at most 274° C. The mold temperature of the injection mold is preferably at most 185° C., more preferably at most 180° C., and it is preferably at least 150° C., more preferably at least 160° C. and particularly preferably at least 165° C.

Through-plane thermal conductivity values of up to 5 W/m*K and more can be obtained with the production method according to the invention.

Surprisingly, injection molding parameters were found for compounds of medium and high heat-conductivity with a through-plane thermal conductivity of 1 to <2.5 W/m*K and ≥2.5 W/m*K respectively, in which the degradation of the scale-like boron nitride agglomerates that are preferably used according to the invention is low and in which, additionally, a particularly pronounced orientation occurs in the through-plane direction. Through-plane thermal conductivity thus increases significantly by up to more than 100% compared with injection-molded parts that were produced by injection molding using typical standard parameters.

The component parts according to the invention are used for heat dissipation of component parts or assemblies to be cooled, preferably electronic component parts or assemblies.

The component parts according to the invention contain thin-walled parts, through which heat of component parts or assemblies to be cooled can be dissipated. The thin-walled parts of the component part have a thickness of ≤3 mm, preferably ≤2 mm. The component part according to the invention may be present, for example, as a thin plate having a thickness of ≤3 mm, preferably ≤2 mm, which can be produced, for example, by means of injection molding or extrusion as the shaping method. The component parts according to the invention may also be electrically conductive or electrically insulating. During shaping or in a subsequent processing step, it is also possible to produce a laminate consisting of conductive and non-conductive layers in the form of a thin plate, wherein at least the electrically insulating layer of the thin plate was produced using the polymer/boron nitride compound according to the invention.

After shaping, for example by means of injection molding, the component part according to the invention may also be provided with a coating; it may, for example, be metallized. It is also possible to apply conductor paths.

The component part according to the invention may be present as a flat or curved plate having a uniform or non-uniform wall thickness. The surface of the component part according to the invention may be smooth or textured.

The component part according to the invention may serve as a carrier plate for electronic component parts or transfer heat from one component part to another. The component part according to the invention may also be present as a film or as a thin-walled tube. The component part according to the invention may also be present as a thin-walled essential part of a substantially thin-walled housing, a mounting or a connecting element or a tube. The component part according to the invention may furthermore be present as a cooling fin as part of a cooling element, a housing, a mounting, a connecting element or a tube, wherein the mounting may be a lamp socket, for example. In more complex component parts, the component part according to the invention may, as a plate, be part of a stack of plates, wherein the plate in the stack of plates may serve as a cooling fin.

EXAMPLES AND REFERENCE EXAMPLES

For compounding the polymers with the boron nitride agglomerates or filler mixtures, a ZSE 18 MAXX twin-screw extruder (Leistritz, Nuremburg, Germany) is used. Two different screw configurations are used, one of which is the comparatively rough, "standard," screw configuration with two mixing elements and six kneading blocks (screw configuration 1), the other one is the gentler, "soft," screw configuration with three mixing elements and no kneading blocks (screw configuration 2). The screw speeds are set to 300 RPM and 900 RPM. Polyamide PA 6 (Schulamid® 6 NV 12) is used as the polymer. During compounding, the polymer melt is heated to 265° C. The throughput is set to 6 kg/h in all tests. The polymer is supplied via the main feeder. The filler (boron nitride agglomerates) or the filler mixture (boron nitride agglomerates and secondary fillers) is supplied via a side feeder.

The filler-containing polymer melt is discharged through two 3 mm nozzles, cooled in the form of strands and processed in a shredder to form granules. Via injection molding, 2 mm thin plates having a base of 80×80 mm$^2$ are produced from the granules.

When injection molding the 2 mm thick plates, the gate extends across the entire width of the sample. It should have a thickness of 1-1.8 mm, preferably 1.3-1.7 mm. In subsequent examples, the thickness of the gate is 1.3 mm.

Example 1

Example 1a 4000 g aluminum paste STAPA ALUPOR SK I-NE/70 (from Eckart, Hartenstein, Germany) and 7000 g boron nitride powder BORONID® S1-SF (ESK Ceramics GmbH & Co. KG, Germany; average particle size $d_{50}$=3 μm, measured by means of laser diffraction (Mastersizer 2000, Malvern, wet measurement)) are homogenized with grinding balls in a PE drum on a roller block for 20 hours. The powder mixture is dosed via gravimetric dosing with 8 kg/h in a roller compactor RC 250*250 (Powtec, Remscheid, Germany). The roller compacter is modified in such a way that the smooth stainless steel rollers make contact when they run empty. A contact force of 75 kN is exerted on the rollers, which corresponds to 3 kN/cm of the roller gap length, and the roller speed is set to 20 RPM. This results in boron nitride hybrid flakes having a thickness of 30 μm and a diameter of up to several centimeters. Green (i.e. compacted but not yet temperature-treated) boron nitride hybrid flakes adhering to the rollers are removed by a scraper. After compaction, the fines <200 μm are removed by sieving and fed in during the next raw material homogenization with 4000 g aluminum paste and 7000 g boron nitride powder S1 in a PE drum. The process is repeated until a total of 55 kg boron nitride hybrid flakes have been produced. The boron nitride hybrid flakes are debinded under exclusion of air in an atmosphere of 80% nitrogen and 20% argon at 300° C., and the aluminum proportion in the boron nitride hybrid flakes is for the most part converted into AlN at 800° C. in an atmosphere of 80% nitrogen and 20% argon during a dwell time of 5 hours. High-temperature annealing is subsequently carried out at 2050° C. for 2 hours in an atmosphere of 80% nitrogen and 20% argon.

After annealing, the total aluminum proportion in the boron nitride hybrid flakes is 24.6% by weight measured by means of alkali melt fusion and ICP-OES (Arcos, Spectro, Kleve, Germany). An aluminum nitride proportion of 37% by weight is calculated from the aluminum proportion in the boron nitride hybrid flake.

The aluminum-free content is 0.35% by weight. The aluminum-free content is measured by means of extraction with 2-molar HCl for 16 h at room temperature. From the clear supernatant from the extraction, the aluminum content of the solution is determined with ICP-OES (Arcos, Spectro, Kleve, Germany). The carbon content is 0.05%; it is measured indirectly by combustion in oxygen in an induction furnace and subsequent IR measurement of $CO_2$ (CS200, LECO, Monchengladbach, Germany).

The specific surface area was measured according to ISO 18757 by means of nitrogen adsorption and the 5 point BET method using the Coulter SA 3100 machine (Coulter, USA). Prior to measuring, the sample is baked in a vacuum at 300° C. for 360 minutes. The specific surface area is 6.8 $m^2$/g.

The oxygen content was determined indirectly by means of carrier gas hot extraction, wherein the oxygen from the sample is reacted with carbon, and the content of developing $CO_2$ is determined by IR spectroscopy (TCH 600, LECO, Mönchengladbach, Germany). The oxygen content is 0.15%.

With X-ray diffractometry, it was possible to detect only the phases boron nitride and aluminum nitride.

The boron nitride hybrid flakes are comminuted by sieving in a vibrating screen with rubber balls. Sieves in the sequence 5 mm, 2 mm, 1 mm and 500 μm are used.

The obtained boron nitride hybrid flakes in the sieve fraction <500 μm have an average particle size ($d_{50}$) of 192 μm, measured by means of laser diffraction (Mastersizer 2000, Malvern, wet measurement). The thickness of the boron nitride hybrid flakes is 30 μm. The thickness is determined using a digital precision gauge.

The texture index that is measured on a fill of boron nitride hybrid flakes is 20.6.

From the boron nitride hybrid flakes that are produced, a fraction <200 μm is broken up, and the fines <100 μm are separated by sieving. Agglomerate stability is determined on the sieve fraction 100-200 μm of the boron nitride hybrid flakes thus obtained using the ultrasound method. Agglomerate stability that is determined on the boron nitride hybrid flakes is 75%.

The SEM overview image of the boron nitride hybrid flakes that are produced in the sieve fraction <500 μm (FIG. 3a) clearly shows the flat surfaces of the agglomerates. These surfaces are shaped surfaces which were produced directly by the shaping method (compressing between two rotating, counter-moving rollers) and not by subsequent comminution. FIG. 3b shows a fractured surface of an agglomerate having a thickness of 30 μm, the flat shaped surface of said agglomerate and the flat shaped surface of an additional agglomerate.

Example 1b

In a twin-screw extruder (Leistritz ZSE 18 MAXX, Nuremburg, Germany), polyamide PA 6 (Schulamid® 6 NV 12, A. Schulman, Kerpen, Germany) is added as the polymer in a gravimetric main feeding and boron nitride hybrid flakes from example 1a) in a gravimetric side feeding. The soft screw configuration 2 is used. The screw speed is set to 300 RPM and a throughput of 6 kg/h is run, wherein 3.05 kg/h PA 6 is dosed in the main feeding and 2.95 kg/h boron nitride hybrid flakes from the sieve fraction <500 μm in the side feeding. The obtained compound is channeled through two 3 mm nozzles, passes through a cooling section in a water bath and is shredded to form granules. The proportion of boron nitride hybrid flakes in the compound is 30% by volume.

Example 1c

The compound granules from example 1b) are injection-molded in an injection molding machine (Krauss Maffei KM 80-220 C2) to form 2 mm thin plates having the dimensions 80×80×2 $mm^3$. The screw speed during plasticization is 80 RPM. The injection rate during injection molding is 20 mm/s, the injection pressure is 780 bar, the holding pressure is 260 bar, the mold temperature of the injection mold is 90° C. and the melt temperature of the compound melt is 250° C.

Thermal conductivity is measured on disk-shaped injection-molded samples having a thickness of 2 mm, wherein the sample for measuring through-plane thermal conductivity is prepared from the center of an injection-molded plate having a thickness of 2 mm (dimensions 2×80×80 $mm^3$) having the dimensions 2×10×10 $mm^3$. The thickness of the sample for through-plane thermal conductivity measurement corresponds to the plate thickness from the injection molding. For measuring in-plane thermal conductivity, a stack of plates of injection-molded 2 mm thin plates is glued together with instant glue, and from the stack of plates thus prepared, a 2 mm thin plate having the dimensions 2×10×10 mm³ is prepared parallel to the through-plane direction and perpendicular to the flow direction of the injection-molded samples. In-plane thermal conductivity is determined on this sample.

For measuring thermal conductivity, the laser-flash method is used and carried out with the Nanoflash LFA 447 (Netzsch, Seib, Germany) according to DIN EN ISO 22007-4. Measurements are taken at 22° C.

Thermal conductivity (TC) is determined by measuring the values for thermal diffusivity a, specific thermal capacity $c_p$ and density D, and is calculated from these values according to the equation $$TC = a * c_p * D.$$

a and $c_p$ are measured with the Nanoflash LFA 447 (Netzsch, Selb, Germany) on the samples that are produced as described above, having the dimensions 10×10×2 mm³. Density is calculated by weighing and determining the geometrical dimensions of the precisely shaped samples. The standard Pyroceram 9606 is used for the measurement.

Table 1 shows the results of thermal conductivity measurements and the injection molding parameters.

Thermal conductivity for the unfilled polymer PA 6 (Schulamid® 6 NV 12) that is, determined on an injection-molded thin plate having the dimensions 80×80×2 mm³ is 0.26 W/m*K.

Example 2

Production of boron nitride hybrid flakes and compounding are carried out according to example 1. Injection molding is carried out as described in example 1, but with an injection rate of 70 mm/s. The injection pressure is 700 bar, the holding pressure is 230 bar.

The thermal conductivity measurements are carried out as described in example 1. Table 1 shows the injection molding parameters and the results of the thermal conductivity measurements.

Example 3

Production of boron nitride hybrid flakes and compounding are carried out according to example 1. Injection molding is carried out as described in example 1, but with an injection rate of 120 mm/s. The injection pressure is 765 bar, the holding pressure is 255 bar.

The thermal conductivity measurements are carried out as described in example 1. Table 1 shows the injection molding parameters and the results of the thermal conductivity measurements.

Example 4

Production of boron nitride hybrid flakes and compounding are carried out according to example 1. Injection molding is carried out as described in example 1, but with a mold temperature of 150° C. The injection pressure is 820 bar, the holding pressure is 260 bar.

The thermal conductivity measurements are carried out as described in example 1. Table 1 shows the injection molding parameters and the results of the thermal conductivity measurements.

Example 5

Production of boron nitride hybrid flakes and compounding are carried out according to example 1. Injection molding is carried out as described in example 1, but with an injection rate of 120 mm/s and a mold temperature of 150° C. The injection pressure is 640 bar, the holding pressure is 255 bar.

The thermal conductivity measurements are carried out as described in example 1. Table 1 shows the injection molding parameters and the results of the thermal conductivity measurements.

Example 6

Production of boron nitride hybrid flaked is carried out according to example 1. Compounding is carried out according to example 1, wherein 1.84 kg/h PA 6 is worked in via the main feeder and 4.16 kg/h boron nitride hybrid flakes from the sieve fraction <500 µm via the side feeder. Injection molding is carried out as described in example 1, but with an injection rate of 70 mm/s and a mold temperature of 150° C. The injection pressure is 1270 bar, the holding pressure is 425 bar.

The thermal conductivity measurements are carried out as described in example 1. Table 1 shows the injection molding parameters and the results of the thermal conductivity measurements.

Example 7

Production of boron nitride hybrid flakes and compounding are carried out according to example 6. Injection molding is carried out as described in example 6, but with an injection rate of 120 mm/s.

The thermal conductivity measurements are carried out as described in example 1. Table 1 shows the injection molding parameters and the results of the thermal conductivity measurements.

Example 8

Production of the boron nitride hybrid flakes and compounding are carried out according to example 6. Injection molding is carried out as described in example 6, but with a mold temperature of 175° C.

The thermal conductivity measurements are carried out as described in example 1. Table 1 shows the injection molding parameters and the results of the thermal conductivity measurements.

Example 9

Production of boron nitride hybrid flakes and compounding are carried out according to example 6. Injection molding is carried out as described in example 6, but with an injection rate of 120 mm/s and a mold temperature of 175° C.

The thermal conductivity measurements are carried out as described in example 1. Table 1 shows the injection molding parameters and the results of the thermal conductivity measurements.

Example 10

Production of boron nitride hybrid flakes and compounding are carried out according to example 6. Injection molding is carried out as described in example 6, but with an injection rate of 20 mm/s, a mold temperature of 175° C. and a melt temperature of 265° C. The injection pressure is 1300 bar, the holding pressure is 425 bar.

The thermal conductivity measurements are carried out as described in example 1. Table 1 shows the injection molding parameters and the results of the thermal conductivity measurements.

Example 11

Production of boron nitride hybrid flakes and compounding are carried out according to example 6. Injection molding is carried out as described in example 6, but with an injection rate of 175° C. and a mold temperature of 265° C. The injection pressure is 1300 bar, the holding pressure is 425 bar.

The thermal conductivity measurements are carried out as described in example 1. Table 1 shows the injection molding parameters and the results of the thermal conductivity measurements.

Example 12

Production of boron nitride hybrid flakes and compounding are carried out according to example 6. Injection molding is carried out as described in example 6, but with an injection rate of 120 mm/s, a mold temperature of 175° C. and a melt temperature of 265° C. The injection pressure is 1290 bar, the holding pressure is 425 bar.

The thermal conductivity measurements are carried out as described in example 1. Table 1 shows the injection molding parameters and the results of the thermal conductivity measurements.

Example 13

In a twin-screw extruder (Leistritz ZSE 18 MAXX, Nuremburg, Germany), polyamide PA 6 (Schulamid® 6 NV 12, A. Schulman, Kerpen, Germany) is added as the polymer in a gravimetric main feeding and boron nitride hybrid flakes from example 1a) in a gravimetric side feeding. The soft screw configuration 2 is used. The screw speed is set to 300 RPM and a throughput of 6 kg/h is run, wherein 1.84 kg/h PA 6 is dosed in the main feeding and 4.16 kg/h boron nitride hybrid flakes from the sieve fraction <500 μm in the side feeding. The proportion of boron nitride hybrid flakes in the PA 6 compound thus produced is 50% by volume. A second PA 6 compound having an aluminosilicate volume of 50% is produced. To this end, in a twin-screw extruder, 1.44 kg/h PA 6 is dosed in the main feeding and, in the side feeding, 4.56 kg/h of the aluminosilicate Trefil 1360-400 (Quarzwerke, Frechen, Germany) having an average particle size $d_{50}$ of 6.3 μm. The aluminosilicate has a density of 3.6 g/cm, thermal conductivity is 14 W/m*K. With X-ray diffractometry, the main phase of the aluminosilicate is kyanite ($Al_2SiO_5$).

Each of the obtained compounds is channeled through two 3 mm nozzles, passes through a cooling section in a water bath and is individually shredded to form compound granules.

The obtained compound granules with boron nitride hybrid flakes and aluminosilicate are mixed in such a way that 10% by volume boron nitride hybrid flakes and 40% by volume aluminosilicate are present in the compound granule mixture. The mixing ratio corresponds to 16% by weight compound granules with boron nitride hybrid flakes and 84% by weight compound granules with aluminosilicate, The compound granule mixture is subsequently injection-molded in an injection molding machine (Krauss Maffei KM 80-220 C2) to form 2 mm thin plates having the dimensions 80×80×2 $mm^3$. The injection rate is 120 mm/s, the mold temperature is 80° C. and the melt temperature is 250° C. The injection pressure is 1800 bar, the holding pressure is 1000 bar.

The thermal conductivity measurements are carried out as described in example 1. Table 1 shows the injection molding parameters and the results of the thermal conductivity measurements.

Example 14

Production of boron nitride hybrid flakes, compounding and injection molding are carried out according to example 13, wherein the compound granule mixture from each of the individual compounds is mixed in such a way that a proportion of 20% by volume boron nitride hybrid flakes and 30% by volume aluminosilicate is obtained in the PA 6 compound. The thermal conductivity measurements are carried out as described in example 1. Table 1 shows the injection molding parameters and the results of the thermal conductivity measurements.

Example 15

Production of boron nitride hybrid flakes and compounding are carried out according to example 13, wherein the compound granule mixture from each of the individual compounds is mixed in such a way that 30% by volume boron nitride hybrid flakes and 20% by volume aluminosilicate are obtained. Injection molding is carried out as described in example 13, but the injection rate is 70 mm/s and the mold temperature is 175° C. The injection pressure is 1300 bar, the holding pressure is 425 bar. The thermal conductivity measurements are carried out as described in example 1. Table 1 shows the injection molding parameters and the results of the thermal conductivity measurements.

Example 16

Production of boron nitride hybrid flakes and compounding are carried out according to example 13, wherein the compound granule mixture from each of the individual compounds is mixed in such a way that it contains 40% by volume boron nitride hybrid flakes and 10% by volume aluminosilicate are obtained. Injection molding is carried out according to example 13, but the injection rate is 70 mm/s and the mold temperature is 175° C. The injection pressure is 1300 bar, the holding pressure is 425 bar. The thermal conductivity measurements are carried out as described in example 1. Table 1 shows the injection molding parameters and the results of the thermal conductivity measurements.

Example 17

In a twin-screw extruder (Leistritz ZSE 18 MAXX, Nuremburg, Germany), polyamide PA 6 (Schulamid® 6 NV 12, A. Schulman, Kerpen, Germany) is added as the polymer in a gravimetric main feeding and boron nitride hybrid flakes from example 1a) in a gravimetric side feeding. The soft screw configuration 2 is used. The screw speed is set to 300 RPM and a throughput of 6 kg/h is run, wherein 1.84 kg/h PA 6 is dosed in the main feeding and 4.16 kg/h boron nitride hybrid flakes from the sieve fraction <500 μm in the side feeding. The proportion of boron nitride hybrid flakes in the PA 6 compound thus produced is 50% by volume. A second PA 6 compound having a glass fiber volume of 50% is produced. To this end, in a twin-screw extruder, 2.05 kg/h PA 6 is dosed in the main feeding and 3.95 kg/h glass fibers in the side feeding. The glass fibers that are used are standard commercial glass fibers for reinforcing thermoplastic polymers having a diameter of 14 μm and a fiber length of 4.5 mm. The residual moisture is <0.1%. The glass fibers are silanized, having a silane content of 0.65% by weight.

Each of the obtained compounds is channeled through two 3 mm nozzles, passes through a cooling section in a water bath and is individually shredded to form compound granules.

The obtained compound granules with boron nitride hybrid flakes and glass fibers are mixed in such a way that 20% by volume boron nitride hybrid flakes and 30% by volume glass fibers are present in the compound granule mixture. The mixing ratio corresponds to 43% by weight compound granules with boron nitride hybrid flakes and 57% by weight compound granules with glass fibers. The compound granule mixture is subsequently injection-molded in an injection molding machine (Krauss Maffei KM 80-220 C2) to form 2 mm thin plates having the dimensions 80×80×2 mm$^3$. The injection rate is 120 mm/s, the mold temperature is 175° C. and the melt temperature is 265° C. The screw speed during plasticization is 80 RPM, the injection pressure is 1300 bar and the holding pressure is 425 bar. The 2 mm thin plates are used for measuring thermal conductivity.

For measuring tensile strength, tensile bars (total sample width 20 mm, test width 10 mm, total sample length 170 mm, test length 80 mm, sample thickness 4 mm) are injection-molded. The injection rate is 120 mm/s, the mold temperature is 175° C. and the melt temperature is 265° C. The screw speed of the plasticization unit is 80 RPM, the injection pressure is 1300 bar and the holding pressure is 425 bar. Tensile strength is determined according to DIN EN ISO 527.

The thermal conductivity measurements are carried out as described in example 1. Table 1 shows the injection molding parameters and the results of the thermal conductivity measurements as well as the tensile strength.

Example 18

Production of boron nitride hybrid flakes, compounding and injection molding are carried out according to example 17, wherein the compound granule mixture from each of the individual compounds is mixed in such a way that 30% by volume boron nitride hybrid flakes and 20% by volume glass fibers are obtained. The thermal conductivity measurements are carried out as described in example 1. Table 1 shows the injection molding parameters and the results of the thermal conductivity measurements as well as the tensile strength.

Example 19

Production of boron nitride hybrid flakes, compounding and injection molding are carried out according to example 17, wherein the compound granule mixture from each of the individual compounds is mixed in such a way that 40% by volume boron nitride hybrid flakes and 10% by volume glass fibers are obtained. The thermal conductivity measurements are carried out as described in example 1. Table 1 shows the injection molding parameters and the results of the thermal conductivity measurements as well as the tensile strength.

Example 20

In a twin-screw extruder (Leistritz ZSE 18 MAXX, Nuremburg, Germany), polyamide PA 6 (Schulamid® 6 NV 12, A. Schulman, Kerpen, Germany) is added as the polymer in a gravimetric main feeding and boron nitride hybrid flakes from example 1 a) in a gravimetric side feeding. The soft screw configuration 2 is used. The screw speed is set to 300 RPM and a throughput of 6 kg/h is run, wherein 1.84 kg/h PA 6 is dosed in the main feeding and 4.16 kg/h boron nitride hybrid flakes from the sieve fraction <500 μm in the side feeding. The proportion of boron nitride hybrid flakes in the PA 6 compound thus produced is 50% by volume. A second PA 6 compound having a glass fiber volume of 50% is produced. To this end, in a twin-screw extruder, 2.05 kg/h PA 6 is dosed in the main feeding and 3.95 kg/h glass fibers in the side feeding. Standard commercial glass fibers such as those used in example 17 are used. A third PA 6 compound having an aluminosilicate volume of 50% is produced. To this end, in a twin-screw extruder, 1.44 kg/h PA 6 is dosed in the main feeding and 4.56 kg/h aluminosilicate (from example 17) in the side feeding.

The obtained compounds are channeled through two 3 mm nozzles, pass through a cooling section in a water bath and are individually shredded to form compound granules.

The obtained compound granules are mixed in such a way that 20% by volume boron nitride hybrid flakes, 15% by volume glass fibers and 15% by volume aluminosilicate are present in the compound granule mixtures. The mixing ratio corresponds to 38% by weight compound granules with boron nitride hybrid flakes, 36% by weight compound granules with aluminosilicate and 26% by weight compound granules with glass fibers. The compound granule mixture is subsequently injection-molded in an injection molding machine (Krauss Maffei KM 80-220 C2) to form 2 mm thin plates having the dimensions 80×80×2 mm$^3$. The injection rate is 120 mm/s, the mold temperature is 175° C. and the melt temperature is 265° C.

The screw speed during plasticization is 80 RPM, the injection pressure is 1100 bar and the holding pressure is 425 bar. The 2 mm thin plates are used for measuring thermal conductivity.

The thermal conductivity measurements are carried out as described in example 1. Table 1 shows the injection molding parameters and the results of the thermal conductivity measurements.

Reference Example 1

In a twin-screw extruder (Leistritz ZSE 18 MAXX, Nuremburg, Germany), polyamide PA 6 (Schulamid® 6 NV 12, A. Schulman, Kerpen, Germany) is added as the polymer in the gravimetric main feeding and boron nitride hybrid flakes from example 1a) in a gravimetric side feeding. The standard screw configuration 1 is used. The screw speed is set to 300 RPM and a throughput of 6 kg/h is run, wherein 3.05 kg/h PA 6 is dosed in the main feeding and 2.95 kg/h boron nitride hybrid flakes from the sieve fraction <500 μm in the side feeding. The obtained compound is channeled through two 3 mm nozzles, passes through a cooling section in a water bath and is shredded to form granules. The proportion of boron nitride hybrid flakes in the compound is 30% by volume.

The obtained compound granules are injection-molded in an injection molding machine (Engel e-motion) to form 2 mm thin plates having the dimensions 80×80×2 mm$^3$. The injection rate is 250 mm/s, the mold temperature is 90° C. and the melt temperature is 275° C.

The thermal conductivity measurements are carried out as described in example 1. Table 1 shows the injection molding parameters and the results of the thermal conductivity measurements.

Reference Example 2

Compounding is carried out according to reference example 1, wherein 1.84 kg/h PA 6 is worked in via the main feeder and 4.16 kg/h boron nitride hybrid flakes via the side feeder. Boron nitride hybrid flakes according to example 1 are used. Injection molding is carried out according to reference example 1.

The thermal conductivity measurements are carried out as described in example 1. Table 1 shows the injection molding parameters and the results of the thermal conductivity measurements.

Reference Example 3

Production of boron nitride hybrid flakes and compounding are carried out according to example 17. Injection molding is carried out according to example 17; however, the injection rate is 40 mm/s, the mold temperature is 80° C. and the melt temperature is 250° C. The injection pressure is 820 bar and the holding pressure is 500 bar. The thermal conductivity measurements are carried out as described in example 1. Table 1 shows the injection molding parameters and the results of the thermal conductivity measurements as well as the tensile strength.

Reference Example 4

Production of boron nitride hybrid flakes and compounding are carried out according to example 18. Injection molding is carried out according to example 18, but the injection rate is 40 mm/s, the mold temperature is 80° C. and the melt temperature is 250° C. The injection pressure is 900 bar and the holding pressure is 480 bar. The thermal conductivity measurements are carried out as described in example 1. Table 1 shows the injection molding parameters and the results of the thermal conductivity measurements as well as the tensile strength.

Reference Example 5

Production of boron nitride hybrid flakes and compounding are carried out according to example 19. Injection molding is carried out according to example 19, but the injection rate is 40 mm/s, the mold temperature is 80° C. and the melt temperature is 250° C. The injection pressure is 1000 bar and the holding pressure is 410 bar. The thermal conductivity measurements are carried out as described in example 1. Table 1 shows the injection molding parameters and the results of the thermal conductivity measurements as well as the tensile strength.

TABLE 1

| No. | Scale-like boron nitride agglomerates [% by volume] | Alumino-silicate [% by volume] | Glass fiber [% by volume] | Injection rate [mm/s] | Melt temperature [° C.] | Mold temperature [° C.] | Through-plane thermal conductivity [W/m*K] | In-plane thermal conductivity [W/m*K] | Tensile strength [Mpa] |
|---|---|---|---|---|---|---|---|---|---|
| Example | | | | | | | | | |
| 1 | 30 | 0 | 0 | 20 | 250 | 90 | 1.7 | 3.6 | n.d. |
| 2 | 30 | 0 | 0 | 70 | 250 | 90 | 1.5 | 3.7 | n.d. |
| 3 | 30 | 0 | 0 | 120 | 250 | 90 | 1.4 | 3.7 | n.d. |
| 4 | 30 | 0 | 0 | 20 | 250 | 150 | 1.5 | 3.7 | n.d. |
| 5 | 30 | 0 | 0 | 120 | 250 | 150 | 1.3 | 3.3 | n.d. |
| 6 | 50 | 0 | 0 | 70 | 250 | 150 | 4.0 | 5.2 | n.d. |
| 7 | 50 | 0 | 0 | 120 | 250 | 150 | 3.8 | 4.0 | n.d. |
| 8 | 50 | 0 | 0 | 70 | 250 | 175 | 4.1 | 5.0 | n.d. |
| 9 | 50 | 0 | 0 | 120 | 250 | 175 | 3.9 | 6.9 | n.d. |
| 10 | 50 | 0 | 0 | 20 | 265 | 175 | 3.7 | 6.0 | n.d. |
| 11 | 50 | 0 | 0 | 70 | 265 | 175 | 3.3 | 8.1 | n.d. |
| 12 | 50 | 0 | 0 | 120 | 265 | 175 | 3.0 | 7.8 | n.d. |
| 13 | 10 | 40 | 0 | 120 | 250 | 80 | 1.9 | 2.9 | n.d. |
| 14 | 20 | 30 | 0 | 120 | 250 | 80 | 2.3 | 3.9 | n.d. |
| 15 | 30 | 20 | 0 | 70 | 250 | 175 | 2.6 | 5.1 | n.d. |
| 16 | 40 | 10 | 0 | 70 | 250 | 175 | 2.8 | 5.8 | n.d. |
| 17 | 20 | 0 | 30 | 120 | 265 | 175 | 1.3 | 1.8 | 123 |
| 18 | 30 | 0 | 20 | 120 | 265 | 175 | 1.8 | 3.1 | 89 |
| 19 | 40 | 0 | 10 | 120 | 265 | 175 | 2.4 | 5.5 | 63 |
| 20 | 20 | 15 | 15 | 120 | 265 | 175 | 1.8 | 3.5 | n.d. |
| Reference example | | | | | | | | | |
| 1 | 30 | 0 | 0 | 250 | 275 | 90 | 1.2 | 2.9 | n.d. |
| 2 | 50 | 0 | 0 | 250 | 275 | 90 | 2.6 | 4.9 | n.d. |
| 3 | 20 | 0 | 30 | 40 | 250 | 80 | n.d. | n.d. | 113 |
| 4 | 30 | 0 | 20 | 40 | 250 | 80 | n.d. | n.d. | 79 |
| 5 | 40 | 0 | 10 | 40 | 250 | 80 | n.d. | n.d. | 55 |

*) n.d.: not determined

The invention claimed is:

1. A method for producing a component part, the component part having a wall thickness of at most 3 mm on at least one part of the component part, comprising injection molding a compound at a melt temperature, the compound comprising a thermoplastically processable polymer material and platelet-shaped hexagonal boron nitride particles, at an injection rate of at most 200 mm/s; wherein the polymer/boron nitride compound contains no glass fibers;

the melt temperature of the compound during the injection molding is at least 10° C. and at most 60° C. higher than the melting temperature of the polymer material without heat-conducting filler; and either (a) (i) the injection molding takes place at a mold temperature of at least 30° C. and at most 120° C. lower than the heat deflection temperature of the polymer material without heat-conducting filler, as measured at 0.45 MPa according to DIN EN ISO 75-1/-2, and (ii) the through-plane thermal conductivity of the component part is at least 1 W/m*K and less than 2.5 W/m*K as measured according to DIN EN ISO 22007-4 on disk-shaped injection-molded samples having a thickness of 2 mm; or (b) (iii) the injection molding takes place at a mold temperature of at least 5° C. and at most 70° C. lower than the heat deflection temperature of the thermoplastically processable polymer without heat-conducting filler, as measured at 0.45 MPa according to DIN EN ISO 75-1/-2, and (iv) the through-plane thermal conductivity of the component part is at least 2.5 W/m*K as measured according to DIN EN ISO 22007-4 on disk-shaped injection-molded samples having a thickness of 2 mm.

2. The method of claim 1, wherein (a) (i) the injection molding takes place at a mold temperature of at least 30° C. and at most 120° C. lower than the heat deflection temperature of the polymer material without heat-conducting filler, as measured at 0.45 MPa according to DIN EN ISO 75-1/-2, and (ii) the through-plane thermal conductivity of the component part is at least 1 W/m*K and less than 2.5 W/m*K as measured according to DIN EN ISO 22007-4 on disk-shaped injection-molded samples having a thickness of 2 mm.

3. The method of claim 2, wherein the melt temperature of the compound is at least 20° C. and at most 50° C.

4. The method of claim 2, wherein the injection rate is ≤175 mm/s.

5. The method of claim 4, wherein the injection rate is ≤70 mm/s.

6. A component part having a wall thickness of at most 3 mm on at least one part of the component part, obtained by the method according to claim 2.

7. The method of claim 1, wherein (b) (iii) the injection molding takes place at a mold temperature of at least 5° C. and at most 70° C. lower than the heat deflection temperature of the thermoplastically processable polymer without heat-conducting filler, as measured at 0.45 MPa according to DIN EN ISO 75-1/-2, and (iv) the through-plane thermal conductivity of the component part is at least 2.5 W/m*K as measured according to DIN EN ISO 22007-4 on disk-shaped injection-molded samples having a thickness of 2 mm.

8. The method of claim 7, wherein the melt temperature of the compound during the injection molding is at least 20° C. and at most 50° C. lower than the heat deflection temperature of the polymer material without heat-conducting filler, as measured at 0.45 MPa according to DIN EN ISO 75-1/-2.

9. The method of claim 7, wherein the injection rate is ≤175 mm/s.

10. The method of claim 9, wherein the injection rate is ≤70 mm/s.

11. A component part having a wall thickness of at most 3 mm on at least one part of the component part, obtained by the method according to claim 7.

12. A method for producing a component part, the component part having a wall thickness of at most 3 mm on at least one part of the component part, comprising injection molding a compound at a melt temperature, the compound comprising a thermoplastically processable polymer material and platelet-shaped hexagonal boron nitride particles, at an injection rate of at most 200 mm/s; wherein the compound contains glass fibers, the injection rate during injection-molding is at least 50 mm/s, the melt temperature of the compound during the injection molding is at least 10° C. and at most 60° C. higher than the melting temperature of the thermoplastically processable polymer without heat-conducting filler, and the injection molding takes place at a mold temperature of at least 5° C. and at most 40° C. lower than the heat deflection temperature of the thermoplastically processable polymer without heat-conducting filler, as measured at 0.45 MPa according to DIN EN ISO 75-1/-2.

13. The method according to claim 12, wherein the melt temperature of the compound during the injection molding is at least 20° C. and at most 55° C. higher than the melting temperature of the polymer material without heat-conducting filler, and wherein the injection molding takes place at a mold temperature of at least 10° C. and at most 30° C. lower than the heat deflection temperature of the thermoplastically processable polymer without heat-conducting filler, as measured at 0.45 MPa according to DIN EN ISO 75-1/-2.

14. The method of claim 12, wherein the injection rate is ≤175 mm/s.

15. The method of claim 14, wherein the injection rate is ≤70 mm/s.

16. A component part having a wall thickness of at most 3 mm on at least one part of the component part, obtained by the method according to claim 12.

* * * * *